United States Patent
Yang et al.

(10) Patent No.: US 11,606,839 B2
(45) Date of Patent: *Mar. 14, 2023

(54) METHOD, APPARATUS, SYSTEM, AND DEVICE FOR MANAGING A SESSION CORRESPONDING TO MULTIPLE SESSION MANAGEMENT FUNCTION NETWORK ELEMENTS

(71) Applicant: Huawei Technologies Co., Ltd., Shenzhen (CN)

(72) Inventors: Jiao Yang, Xi'an (CN); Tingfang Tang, Shenzhen (CN); Yan Li, Beijing (CN); Hui Ni, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/354,106

(22) Filed: Jun. 22, 2021

(65) Prior Publication Data
US 2021/0315054 A1 Oct. 7, 2021

Related U.S. Application Data

(63) Continuation of application No. 16/726,439, filed on Dec. 24, 2019, now Pat. No. 11,071,167, which is a continuation of application No. PCT/CN2018/092583, filed on Jun. 25, 2018.

(30) Foreign Application Priority Data

Jun. 26, 2017 (CN) .......................... 201710494938.7
Mar. 21, 2018 (CN) .......................... 201810235929.0

(51) Int. Cl.
H04W 80/10 (2009.01)
H04W 76/12 (2018.01)
(Continued)

(52) U.S. Cl.
CPC ........... *H04W 80/10* (2013.01); *H04M 15/66* (2013.01); *H04W 8/08* (2013.01); *H04W 48/16* (2013.01);
(Continued)

(58) Field of Classification Search
CPC ..... H04W 80/10; H04W 76/12; H04W 76/11; H04W 8/08; H04W 48/16; H04M 15/66; H04L 61/5007; H04L 2101/659
See application file for complete search history.

(56) References Cited

U.S. PATENT DOCUMENTS 10,945,232 B2 3/2021 Lau et al.
2009/0190514 A1 7/2009 Yi et al.
(Continued)

FOREIGN PATENT DOCUMENTS

CN 101753985 A 6/2010
CN 103493579 A 1/2014
(Continued)

OTHER PUBLICATIONS

3rd Generation Partnership Project; Technical Specification Group Services and System Aspects; Procedures for the 5G System; Stage 2 (Release 15), 3GPP TS 23. 502, V0.4.0 (May 2017), 126 pages.
(Continued)

*Primary Examiner* — Mewale A Ambaye
(74) *Attorney, Agent, or Firm* — Slater Matsil, LLP

(57) ABSTRACT

Embodiments of this application provide a session management method, apparatus, and system. The method includes: receiving, by a first session management network element, a session request message from a second session management network element; allocating, by the first session management network element, Internet protocol IP information of a terminal device to a first session based on the session request message, where the first session is a branch of an established (Continued)

second session; and sending, by the first session management network element, the IP information of the terminal device to the second session management network element, where the IP information is used to obtain policy information corresponding to the IP information.

25 Claims, 18 Drawing Sheets

(51) Int. Cl.
    *H04W 76/11* (2018.01)
    *H04M 15/00* (2006.01)
    *H04W 8/08* (2009.01)
    *H04W 48/16* (2009.01)
    *H04L 61/5007* (2022.01)
    *H04L 101/659* (2022.01)

(52) U.S. Cl.
    CPC ............ *H04W 76/11* (2018.02); *H04W 76/12* (2018.02); *H04L 61/5007* (2022.05); *H04L 2101/659* (2022.05)

(56) References Cited

U.S. PATENT DOCUMENTS

| | | |
|---|---|---|
| 2014/0359740 A1 | 12/2014 | Yoon et al. |
| 2017/0086049 A1 | 3/2017 | Vrzic |
| 2019/0191467 A1* | 6/2019 | Dao ..................... H04W 76/12 |
| 2019/0223055 A1* | 7/2019 | Bor Yaliniz ........ H04L 41/0896 |
| 2019/0239280 A1* | 8/2019 | Li ......................... H04W 76/25 |
| 2019/0253917 A1 | 8/2019 | Dao |
| 2019/0289459 A1* | 9/2019 | Shan ....................... H04W 4/24 |
| 2020/0120446 A1* | 4/2020 | Stammers ........... H04L 67/1021 |
| 2020/0252837 A1 | 8/2020 | Kim et al. |
| 2020/0389830 A1 | 12/2020 | Park et al. |

FOREIGN PATENT DOCUMENTS

| | | |
|---|---|---|
| CN | 104488240 B | 4/2017 |
| CN | 106792936 A | 5/2017 |

OTHER PUBLICATIONS

3rd Generation Partnership Project; Technical Specification Group Services and System Aspects; System Architecture for the 5G System; Stage 2 (Release 15); 3GPP TS 23.501 V1.0.0 (Jun. 2017), 146 pages.

Ericsson, "23.501: SMF Service Areas," SA WG2 Meeting #121, S2-173006, May 15-19, 2017, Hangzhou, China, 13 pages.

Ericsson, "SMF Service Areas," SA WG2 Meeting #122. S2-174193, San Jose Del Cabo, Mexico, Jun. 26-30, 2017, 17 pages.

Huawei et al., "SMF relocation of SSC mode 2 and SSC mode 3 with multiple PDU sessions," 3GPP SA WG2 Meeting #122, S2-174480, Jun. 25, 2017, 4 pages.

* cited by examiner

METHOD, APPARATUS, SYSTEM, AND DEVICE FOR MANAGING A SESSION CORRESPONDING TO MULTIPLE SESSION MANAGEMENT FUNCTION NETWORK ELEMENTS

CROSS-REFERENCE TO RELATED APPLICATIONS

This application is a continuation of U.S. patent application Ser. No. 16/726,439, filed on Dec. 24, 2019, which is a continuation of International Application No. PCT/CN2018/092583, filed on Jun. 25, 2018, which claims priority to Chinese Patent Application No. 201810235929.0, filed on Mar. 21, 2018 and Chinese Patent Application No. 201710494938.7, filed on Jun. 26, 2017. All of the aforementioned patent applications are hereby incorporated by reference in their entireties.

TECHNICAL FIELD

This application relates to communications technologies, and in particular, to a session management method, apparatus, and system, and a device.

BACKGROUND

In a 5th generation (5G) mobile communications technology, a concept of a service area of a session management function (SMF) network element is proposed. To be specific, the SMF network element manages only a user plane function (UPF) network element within a corresponding range. When a location of a terminal device changes, a corresponding packet data unit (PDU) session is usually handed over. Therefore, a UPF network element corresponding to the session changes after the handover. However, a UPF network element obtained after the handover may not belong to a service area of an SMF network element corresponding to the UPF network element that is before the handover. For example, the session corresponds to an SMF network element 1 before the session handover, and corresponds to two SMF network elements, namely, the SMF network element 1 and an SMF network element 2, after the handover.

In a scenario in which the session corresponds to two SMF network elements after the session handover, how to perform further session management becomes an urgent problem to be resolved currently.

SUMMARY

Embodiments of this application provide a session management method, apparatus, and system, and a device, to resolve a problem of performing further session management in a scenario in which a session corresponds to two SMF network elements.

According to a first aspect, this application provides a session management method, including: receiving, by a first session management network element, a session request message from a second session management network element; allocating, by the first session management network element, Internet protocol (IP) information of a terminal device to a first session based on the session request message, where the first session is a branch of an established second session, or the first session and the established second session are different sessions; and sending, by the first session management network element, the IP information of the terminal device to a policy control function network element or the second session management network element, where the IP information is used to obtain policy information corresponding to the IP information.

According to the data transmission method provided in the first aspect, the first session management network element receives the session request message from the second session management network element; the first session management network element allocates the Internet protocol IP information of the terminal device to the first session based on the session request message; and the first session management network element sends the IP information of the terminal device to the policy control function network element or the second session management network element, where the IP information is used to obtain the policy information corresponding to the IP information, so that the first session management network element and the second session management network element cooperate with each other to implement session management.

In a possible implementation, before the sending, by the first session management network element, the IP information of the terminal device to a policy control function network element, the method further includes: obtaining, by the first session management network element, an identity of the policy control function network element; and the sending, by the first session management network element, the IP information of the terminal device to a policy control function network element includes: sending, by the first session management network element, the IP information of the terminal device to the policy control function network element based on the identity of the policy control function network element.

In a possible implementation, the obtaining, by the first session management network element, an identity of the policy control function network element includes: receiving, by the first session management network element, the identity of the policy control function network element from the second session management network element; or receiving, by the first session management network element, the identity of the policy control function network element from an access and mobility management function network element.

In a possible implementation, after the receiving, by a first session management network element, a session request message from a second session management network element, the method further includes: selecting, by the first session management network element, an anchor user plane function network element corresponding to the first session, and determining tunnel information of the anchor user plane function network element.

In a possible implementation, after the receiving, by a first session management network element, a session request message from a second session management network element, the method further includes: selecting, by the first session management network element, a branching point user plane function network element corresponding to the first session, and determining tunnel information of the branching point user plane function network element.

In a possible implementation, the method further includes: sending, by the first session management network element, the tunnel information of the anchor user plane function network element to the access and mobility management function network element.

In a possible implementation, the method further includes: sending, by the first session management network element, the tunnel information of the branching point user plane function network element to the access and mobility management function network element.

In a possible implementation, the method further includes: receiving, by the first session management network element, a session context of the first session from the second session management network element; and sending, by the first session management network element, change indication information to the policy control function network element, where the change indication information is used to indicate that the first session management network element manages the first session.

In a possible implementation, the method further includes: receiving, by the first session management network element, release indication information from the second session management network element, where the release indication information is used to instruct to release the first session; and releasing, by the first session management network element, a user plane resource of the first session and the IP information according to the release indication information.

In a possible implementation, the first session management network element is a session management network element that manages a user plane function network element directly connected to an access network element, and the second session management network element is a session management network element that manages an anchor user plane function network element.

In a possible implementation, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

In a possible implementation, the method further includes: sending, by the first session management network element, the IP information to the terminal device by using a user plane.

In a possible implementation, before the sending, by the first session management network element, the IP information to the terminal device by using a user plane, the method further includes: receiving, by the first session management network element, sending indication information from the second session management network element, where the sending indication information is used to instruct the first session management network element to send the IP information to the terminal device.

In a possible implementation, the session request message includes at least one of the following: an identity of the terminal device, an identity of the first session, a data network name, and a session and service continuity mode.

According to a second aspect, this application provides a session management method, including: determining, by a second session management network element, to newly establish a first session, where the first session is a branch of an established second session, or the first session and the established second session are different sessions; sending, by the second session management network element, a session request message to a first session management network element, where the session request message is used to request the first session management network element to allocate Internet protocol (IP) information of a terminal device to the first session; receiving, by the second session management network element, the IP information of the terminal device from the first session management network element; and obtaining, by the second session management network element, policy information corresponding to the IP information from a policy control function network element based on the IP information.

According to the data transmission method provided in the second aspect, after determining to newly establish the first session, the second session management network element sends the session request message to the first session management network element, where the session request message is used to request the first session management network element to allocate the Internet protocol (IP) information of the terminal device to the first session, so that the first session management network element and the second session management network element cooperate with each other to implement session management.

In a possible implementation, the method further includes: receiving, by the second session management network element, tunnel information of a user plane function network element of the first session from the first session management network element, where the user plane function network element is an anchor user plane function network element or a branching point user plane function network element that corresponds to the first session; and sending, by the second session management network element, the tunnel information of the user plane function network element of the first session to an access and mobility management function network element.

In a possible implementation, the method further includes: sending, by the second session management network element, an identity of the policy control function network element to the first session management network element.

In a possible implementation, the method further includes: sending, by the second session management network element, a session context of the first session to the first session management network element; and sending, by the second session management network element, change indication information to the access and mobility management function network element, where the change indication information is used to indicate that the first session management network element manages the first session.

In a possible implementation, the method further includes: sending, by the second session management network element, release indication information to the first session management network element when determining that the first session needs to be released, where the release indication information is used to instruct to release the first session.

In a possible implementation, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

In a possible implementation, the first session management network element is a session management network element that manages a user plane function network element directly connected to an access network element, and the second session management network element is a session management network element that manages an anchor user plane function network element.

In a possible implementation, the method further includes: sending, by the second session management network element, sending indication information to the first session management network element, where the sending indication information is used to instruct the first session management network element to send the IP information to the terminal device.

In a possible implementation, the session request message includes at least one of the following: an identity of the terminal device, an identity of the first session, a data network name, and a session and service continuity mode.

According to a third aspect, this application provides a session management apparatus, including: a receiving module, configured to receive a session request message from a second session management network element; a processing module, configured to allocate Internet protocol IP information of a terminal device to a first session based on the session request message, where the first session is a branch of an established second session, or the first session and the established second session are different sessions; and a sending module, configured to send the IP information of the terminal device to a policy control function network element or the second session management network element, where the IP information is used to obtain policy information corresponding to the IP information.

In a possible implementation, the receiving module is further configured to obtain an identity of the policy control function network element.

The sending module is specifically configured to send the IP information of the terminal device to the policy control function network element based on the identity of the policy control function network element.

In a possible implementation, that the receiving module obtains the identity of the policy control function network element specifically includes: receiving the identity of the policy control function network element from the second session management network element; or receiving the identity of the policy control function network element from an access and mobility management function network element.

In a possible implementation, the processing module is further configured to select an anchor user plane function network element corresponding to the first session, and determine tunnel information of the anchor user plane function network element.

In a possible implementation, the processing module is further configured to select a branching point user plane function network element corresponding to the first session, and determine tunnel information of the branching point user plane function network element.

In a possible implementation, the sending module is further configured to send the tunnel information of the anchor user plane function network element to the access and mobility management function network element.

In a possible implementation, the sending module is further configured to send the tunnel information of the branching point user plane function network element to the access and mobility management function network element.

In a possible implementation, the receiving module is further configured to receive a session context of the first session from the second session management network element.

The sending module is further configured to send change indication information to the policy control function network element, where the change indication information is used to indicate that the first session management network element manages the first session.

In a possible implementation, the receiving module is further configured to receive release indication information from the second session management network element, where the release indication information is used to instruct to release the first session.

The processing module is further configured to release a user plane resource of the first session and the IP information according to the release indication information.

In a possible implementation, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

In a possible implementation, the sending module is further configured to send the IP information to the terminal device by using a user plane.

In a possible implementation, the receiving module is further configured to receive sending indication information from the second session management network element, where the sending indication information is used to instruct the first session management network element to send the IP information to the terminal device.

In a possible implementation, the session request message includes at least one of the following: an identity of the terminal device, an identity of the first session, a data network name, and a session and service continuity mode.

For beneficial effects of the data transmission apparatus provided in the third aspect and the possible implementations of the third aspect, refer to beneficial effects brought by the first aspect and the possible implementations of the first aspect, and details are not described herein again.

According to a fourth aspect, this application provides a session management apparatus, including: a processing module, configured to determine to newly establish a first session, where the first session is a branch of an established second session, or the first session and the established second session are different sessions; and a sending module, configured to send a session request message to a first session management network element, where the session request message is used to request the first session management network element to allocate Internet protocol (IP) information of a terminal device to the first session.

In a possible implementation, the apparatus further includes: a receiving module, configured to receive the IP information of the terminal device from the first session management network element.

The processing module is further configured to obtain policy information corresponding to the IP information from a policy control function network element based on the IP information.

In a possible implementation, the sending module is further configured to send an identity of a policy control function network element to the first session management network element.

In a possible implementation, the receiving module is further configured to receive tunnel information of a user plane function network element of the first session from the first session management network element, where the user plane function network element is an anchor user plane function network element or a branching point user plane function network element that corresponds to the first session.

The sending module is further configured to send the tunnel information of the user plane function network element of the first session to an access and mobility management function network element.

In a possible implementation, the sending module is further configured to send a session context of the first session to the first session management network element.

The sending module is further configured to send change indication information to the access and mobility management function network element, where the change indication information is used to indicate that the first session management network element manages the first session.

In a possible implementation, the sending module is further configured to send release indication information to the first session management network element when it is determined that the first session needs to be released, where the release indication information is used to instruct to release the first session.

In a possible implementation, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

In a possible implementation, the sending module is further configured to send sending indication information to the first session management network element, where the sending indication information is used to instruct the first session management network element to send the IP information to the terminal device.

In a possible implementation, the session request message includes at least one of the following: an identity of the terminal device, an identity of the first session, a data network name, and a session and service continuity mode.

For beneficial effects of the data transmission apparatus provided in the fourth aspect and the possible implementations of the fourth aspect, refer to beneficial effects brought by the second aspect and the possible implementations of the second aspect, and details are not described herein again.

According to a fifth aspect, this application provides a network element, where the network element is a first session management network element, and the network element includes: a receiver, configured to receive a session request message from a second session management network element; a processor, configured to allocate Internet protocol (IP) information of a terminal device to a first session based on the session request message, where the first session is a branch of an established second session, or the first session and the established second session are different sessions; and a transmitter, configured to send the IP information of the terminal device to a policy control function network element or the second session management network element, where the IP information is used to obtain policy information corresponding to the IP information.

In a possible implementation, the receiver is further configured to obtain an identity of the policy control function network element.

The transmitter is specifically configured to send the IP information of the terminal device to the policy control function network element based on the identity of the policy control function network element.

In a possible implementation, that the receiver obtains the identity of the policy control function network element specifically includes: receiving the identity of the policy control function network element from the second session management network element; or receiving the identity of the policy control function network element from an access and mobility management function network element.

In a possible implementation, the processor is further configured to select an anchor user plane function network element corresponding to the first session, and determine tunnel information of the anchor user plane function network element.

In a possible implementation, the processor is further configured to select a branching point user plane function network element corresponding to the first session, and determine tunnel information of the branching point user plane function network element.

In a possible implementation, the transmitter is further configured to send the tunnel information of the anchor user plane function network element to the access and mobility management function network element.

In a possible implementation, the transmitter is further configured to send the tunnel information of the branching point user plane function network element to the access and mobility management function network element.

In a possible implementation, the receiver is further configured to receive a session context of the first session from the second session management network element.

The transmitter is further configured to send change indication information to the policy control function network element, where the change indication information is used to indicate that the first session management network element manages the first session.

In a possible implementation, the receiver is further configured to receive release indication information from the second session management network element, where the release indication information is used to instruct to release the first session.

The processor is further configured to release a user plane resource of the first session and the IP information according to the release indication information.

In a possible implementation, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

In a possible implementation, the transmitter is further configured to send the IP information to the terminal device by using a user plane.

In a possible implementation, the receiver is further configured to receive sending indication information from the second session management network element, where the sending indication information is used to instruct the first session management network element to send the IP information to the terminal device.

In a possible implementation, the session request message includes at least one of the following: an identity of the terminal device, an identity of the first session, a data network name, and a session and service continuity mode.

For beneficial effects of the data transmission apparatus provided in the fifth aspect and the possible implementations of the fifth aspect, refer to beneficial effects brought by the first aspect and the possible implementations of the first aspect, and details are not described herein again.

According to a sixth aspect, this application provides a network element, where the network element is a second session management network element, and the network element includes: a processor, configured to determine to newly establish a first session, where the first session is a branch of an established second session, or the first session and the established second session are different sessions; and a transmitter, configured to send a session request message to a first session management network element, where the session request message is used to request the first session management network element to allocate Internet protocol IP information of a terminal device to the first session.

In a possible implementation, the network element further includes: a receiver, configured to receive the IP information of the terminal device from the first session management network element.

The processor is further configured to obtain policy information corresponding to the IP information from a policy control function network element based on the IP information.

In a possible implementation, the transmitter is further configured to send an identity of a policy control function network element to the first session management network element.

In a possible implementation, the receiver is further configured to receive tunnel information of a user plane function network element of the first session from the first session management network element, where the user plane function network element is an anchor user plane function network element or a branching point user plane function network element that corresponds to the first session.

The transmitter is further configured to send the tunnel information of the user plane function network element of the first session to an access and mobility management function network element.

In a possible implementation, the transmitter is further configured to send a session context of the first session to the first session management network element.

The transmitter is further configured to send change indication information to the access and mobility management function network element, where the change indication information is used to indicate that the first session management network element manages the first session.

In a possible implementation, the processor is further configured to send release indication information to the first session management network element by using the transmitter when it is determined that the first session needs to be released, where the release indication information is used to instruct to release the first session.

In a possible implementation, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

In a possible implementation, the transmitter is further configured to send sending indication information to the first session management network element, where the sending indication information is used to instruct the first session management network element to send the IP information to the terminal device.

In a possible implementation, the session request message includes at least one of the following: an identity of the terminal device, an identity of the first session, a data network name, and a session and service continuity mode.

For beneficial effects of the data transmission apparatus provided in the sixth aspect and the possible implementations of the sixth aspect, refer to beneficial effects brought by the second aspect and the possible implementations of the second aspect, and details are not described herein again.

According to a seventh aspect, an embodiment of this application provides a chip, including a processor and a transceiver component. Optionally, the chip further includes a memory and at least one processing element (or chip) configured to perform the method according to the first aspect or the implementations of the first aspect.

According to an eighth aspect, an embodiment of this application provides a chip, including a processor and a transceiver component. Optionally, the chip further includes a memory and at least one processing element (or chip) configured to perform the method according to the second aspect or the implementations of the second aspect.

According to a ninth aspect, this application provides a readable storage medium, where the readable storage medium stores an executable instruction. When at least one processor of a first session management network element executes the executable instruction, the first session management network element performs the session management method according to the first aspect or the implementations of the first aspect.

According to a tenth aspect, this application provides a readable storage medium, where the readable storage medium stores an executable instruction. When at least one processor of a second session management network element executes the executable instruction, the second session management network element performs the session management method according to the second aspect.

According to an eleventh aspect, this application provides a program product, where the program product includes an executable instruction, and the executable instruction is stored in a readable storage medium. At least one processor of a first session management network element may read the executable instruction from the readable storage medium, and the at least one processor executes the executable instruction, so that the first session management network element implements the session management method according to the first aspect or the implementations of the first aspect.

According to a twelfth aspect, this application provides a program product, where the program product includes an executable instruction, and the executable instruction is stored in a readable storage medium. At least one processor of a second session management network element may read the executable instruction from the readable storage medium, and the at least one processor executes the executable instruction, so that the second session management network element implements the session management method according to the second aspect.

According to a thirteenth aspect, this application provides a session management system, including the session management apparatus according to the third aspect or the implementations of the third aspect and the session management apparatus according to the fourth aspect or the implementations of the fourth aspect.

BRIEF DESCRIPTION OF THE DRAWINGS

FIG. 5A-1 and FIG. 5A-2 are a flowchart of a session management method according to another embodiment of this application;

FIG. 7A-1 and FIG. 7A-2 are a flowchart of a session management method according to still another embodiment of this application;

DETAILED DESCRIPTION OF ILLUSTRATIVE EMBODIMENTS

Figure 1:
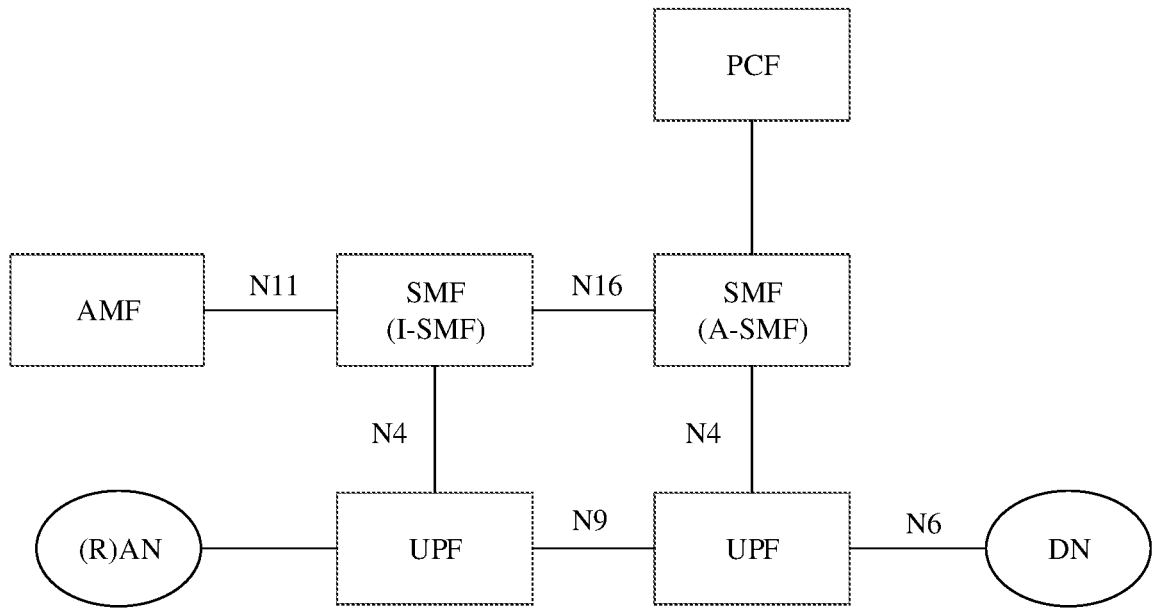
FIG. 1 is a schematic diagram 1 of an application architecture according to an embodiment of this application.

The following describes network elements in this application.

(1) Session management function (SMF) network element: performing session management, including session-related control functions such as session establishment, session modification, session release, allocation and management of an Internet protocol (IP) address or IP prefix of a terminal device, selection and control of a UPF, determining of a session and service continuity mode (SSC mode) of a session, and lawful interception.

(2) User plane function (UPF) network element: a user plane function network element that completes processing functions such as user packet forwarding and statistics collection, for example, user plane functions of a packet data network gateway (PDN-GW) and a serving gateway (S-GW), a GW forwarding plane, and a software-defined networking switch (SDN Switch). A branching point (BP) UPF sends uplink data to different anchor user plane network elements, and aggregates downlink data of different anchor user plane network elements.

(3) Access and mobility management function (AMF) network element: responsible for functions such as registration management, mobility management, and lawful interception.

(4) Policy control function (PCF) network element: performing policy-related functions such as providing a policy rule and supporting a network behavior of unified policy architecture management.

(5) Access network (AN) element: also referred to as a radio access network (RAN) element, which is an apparatus deployed in a radio access network to provide a wireless communication function for a terminal device. The AN element may include base stations in various forms, such as a macro base station, a micro base station (also referred to as a small cell), a relay station, and an access point. In systems using different radio access technologies, a device having a function of a base station may have different names. For example, the device is referred to as an evolved NodeB (eNB or eNodeB) in a long term evolution (LTE) system, and is referred to as a NodeB in a 3rd-generation (3G) system.

The terminal device is a device that has wireless transmission and reception functions. The terminal device may be deployed on land, and may be an indoor device, an outdoor device, a handheld device, or a vehicle-mounted device; may be deployed on the surface of water (for example, in a ship); or may be deployed in the air (for example, on an airplane, a balloon, and a satellite). The terminal may be a mobile phone, a tablet computer (pad), a computer having wireless transmission and reception functions, a virtual reality (VR) terminal, an augmented reality (AR) terminal, a wireless terminal in industrial control, a wireless terminal in self driving, a wireless terminal in remote medical treatment, a wireless terminal in a smart grid, a wireless terminal in transportation safety, a wireless terminal in a smart city, a wireless terminal in a smart home, or the like.

The embodiments of this application may be applied to the following scenarios: On the premise that a serving area of a session management network element is proposed in 5G, after a session of a terminal device is handed over, the session corresponds to two SMF network elements: a first session management network element and a second session management network element. Specifically, when the terminal device establishes a session at a location 1, the session corresponds to an anchor user plane function network element, and the anchor user plane function network element is managed by an SMF 1. When the terminal moves from the location 1 to a location 2, the session is handed over, and a user plane function network element that corresponds to the session and that is directly connected to an access network element is outside a service area of the SMF 1 after the session handover, and is managed by an SMF 2. In this case, the session corresponds to two SMFs, namely, the first session management network element and the second session management network element. Certainly, the embodiments of this application are not necessarily limited to the session handover scenario, and may further be applicable to another scenario in which a session corresponds to two SMF network elements.

Optionally, the first session management network element may be a session management network element that manages a first user plane function network element. The first user plane function network element is a user plane function network element that corresponds to a session (for example, a second session) obtained after the handover and that is directly connected to the access network element, and the first session management network element may also be referred to as an intermediate session management function (intermediate SMF, I-SMF) network element. The second session management network element may be a session management network element that manages an anchor user plane function network element corresponding to the session obtained after the handover, and may also be referred to as an anchor session management function (anchor SMF, A-SMF) network element. Using an example in which the first session management network element is an I-SMF network element and the second session management network element is an A-SMF network element, an application architecture in the embodiments of this application may be shown in FIG. 1 and FIG. 2. FIG. 1 shows a home-routed roaming like architecture. A main difference between architectures shown in FIG. 1 and FIG. 2 lies in: In FIG. 1, there is an interface between the I-SMF network element and an AMF network element, and the A-SMF network element communicates with the AMF network element by using the I-SMF network element; and in FIG. 2, there is an interface between the A-SMF network element and an AMF network element, and the A-SMF network element may directly communicate with the AMF network element without using the I-SMF network element. Optionally, there may also be an interface between the I-SMF and a PCF, and the interface between the I-SMF and the PCF is an N7 interface. It should be noted that, in FIG. 1 and FIG. 2, N4, N6, N9, N11, N16, and N16' are used to identify interfaces between different network elements. For example, the interface between the AMF network element and the I-SMF network element is an N11 interface.

The embodiments of this application mainly resolve a problem of performing further session management, for example, establishing a session (for example, a first session) or newly establishing a session branch (for example, a first session), in a scenario in which a session of a terminal device corresponds to two SMFs. When the session branch is established, specifically, a branch of a session obtained after handover is established, to be specific, the first session is a branch of an established second session. In this case, the first session and the established second session may be understood as a same session (for example, the first session and the second session have a same session ID). When the session is established, the first session and an established second session are different sessions (for example, the first session and the second session have different session IDs). The established second session herein may be specifically a session established by the terminal device by using the second session management network element.

Figure 3:
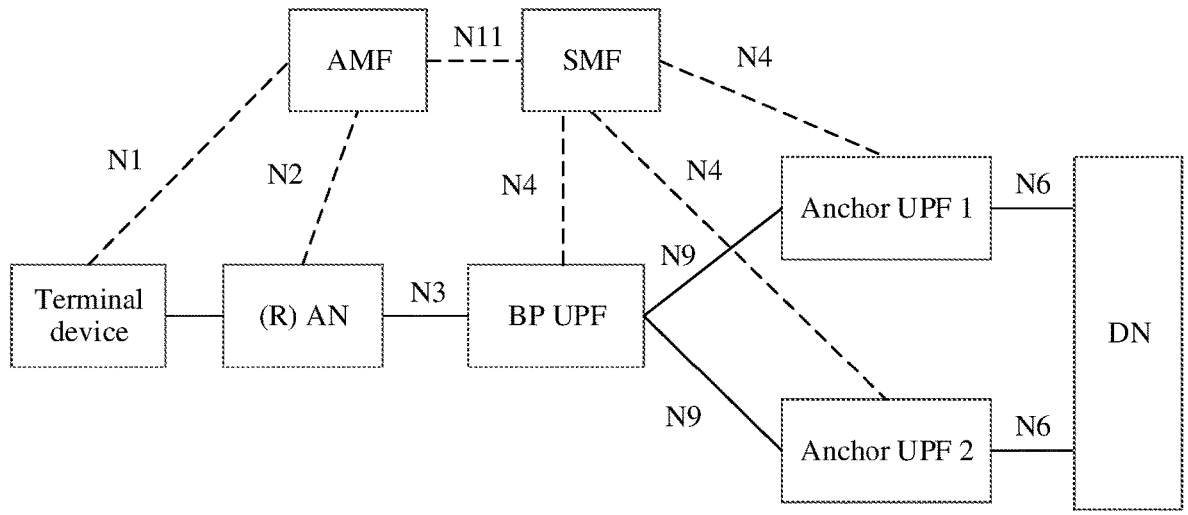
FIG. 3 is a schematic diagram of a scenario of a multi-homed PDU session according to an embodiment of this application.

In the embodiments of this application, establishing the session branch corresponds to a scenario of a multi-homed PDU session. The multi-homed PDU session is mainly applied to IPv6. In this scenario, a session management network element allocates an IP prefix to the terminal device. As shown in FIG. 3, in this scenario, one session corresponds to a plurality of branches, each branch corresponds to one anchor user plane function network element (namely, an anchor UPF 1 and an anchor UPF 2 in FIG. 3), and the access network element is directly connected to a branching point user plane function network element (namely, a BP UPF in FIG. 3). It should be noted that, in a scenario of a non-multihomed PDU session, that is, each session corresponds to one anchor user plane function network element, the access network element may be directly connected to the anchor user plane function network element, or may be directly connected to another user plane function network element that is not an anchor user plane function network element, and then the another user plane function network element is connected to the anchor user plane function network element. It should be noted that, in FIG. 3, N1, N2, N3, N4, N6, N9, and N11 are used to identify interfaces between different network elements.

Specific embodiments are used below to describe in detail the technical solutions of this application. The following several specific embodiments may be combined with each other, and a same or similar concept or process may not be described repeatedly in some embodiments.

Figure 4:
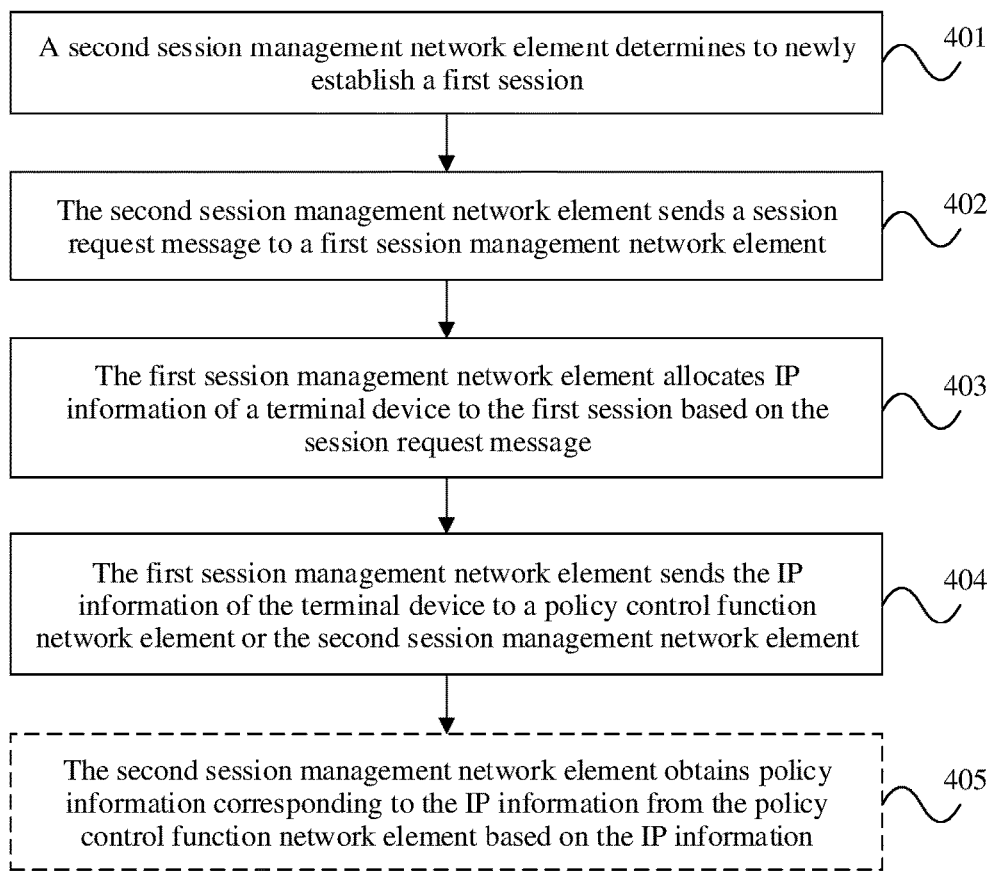
FIG. 4 is a flowchart of a session management method according to an embodiment of this application.

FIG. 4 is a flowchart of a session management method according to an embodiment of this application. As shown in FIG. 4, the method in this embodiment may include the following steps.

Step 401. A second session management network element determines to newly establish a first session.

In this step, optionally, when determining that an anchor user plane function network element of an established second session is not preferred, the second session management network element may determine to newly establish the first session, where the first session is a branch of the established second session, or the first session and the established second session are different sessions.

Step 402. The second session management network element sends a session request message to a first session management network element.

In this step, the session request message is used to request the first session management network element to allocate Internet protocol (IP) information of a terminal device to the first session. When determining that the first session needs to be established, the second session management network element sends the session request message to the first session management network element. Optionally, the second session management network element may determine, based on a message from another network element (for example, an AMF network element), that the first session needs to be established, or the second session management network element may determine, through calculation and analysis, that the first session or a branch of the first session needs to be established. Specifically, the first session may be a session or a branch of a session. This is not limited herein.

In a possible implementation, the first session management network element is a session management network element that manages a user plane function network element directly connected to an access network element, and the second session management network element is a session management network element that manages an anchor user plane function network element.

Step 403. The first session management network element allocates the IP information of the terminal device to the first session based on the session request message.

In this step, the IP information may be specifically an IP address or an IP prefix. The first session management network element may allocate the IP information of the terminal device to the first session based on the session request message, or may allocate the IP information of the terminal device to the first session based on other information.

Optionally, in addition to the function of allocating the IP information, the first session management network element may further complete other functions, for example, selecting an anchor user plane function network element and/or a branching point user plane function network element.

Specifically, after step 402, the method may further include: selecting, by the first session management network element, an anchor user plane function network element corresponding to the first session, and determining tunnel information of the anchor user plane function network element (for example, an IP address of the user plane network element and an identity of the user plane network element); and/or selecting, by the first session management network element, a branching point user plane function network element corresponding to the first session, and determining tunnel information of the branching point user plane function network element.

Optionally, when determining that the access network element needs to learn of the tunnel information of the anchor user plane function network element, the first session management network element may further send the tunnel information of the anchor user plane function network element to the access and mobility management function network element. Further, the access and mobility management function network element sends the tunnel information of the anchor user plane function network element to the access network element. A condition in which the first session management network element determines that the access network element needs to learn of the tunnel information of the anchor user plane function network element may include: the anchor user plane function network element is a user plane function network element that is directly connected to the access network element and that corresponds to the first session. When the condition is not satisfied, the first session management network element does not need to send the tunnel information of the anchor user plane function network element to the access and mobility management function network element.

Similarly, when determining that the access network element needs to learn of the tunnel information of the branching point user plane function network element, the first session management network element may further send the tunnel information of the branching point user plane function network element to the access and mobility management function network element. Further, the access and mobility management function network element sends the tunnel information of the branching point user plane function network element to the access network element. A condition in which the first session management network element determines that the access network element needs to learn of the tunnel information of the branching point user plane function network element may include: the branching point user plane function network element is a user plane function network element that is directly connected to the access network element and that corresponds to the first session, and the branching point user plane function network element and a user plane function network element that is directly connected to the access network element and that corresponds to the second session are different network elements. When the condition is not satisfied, the first session management network element does not need to send the tunnel information of the branching point user plane function network element to the access and mobility management function network element.

Figure 2:
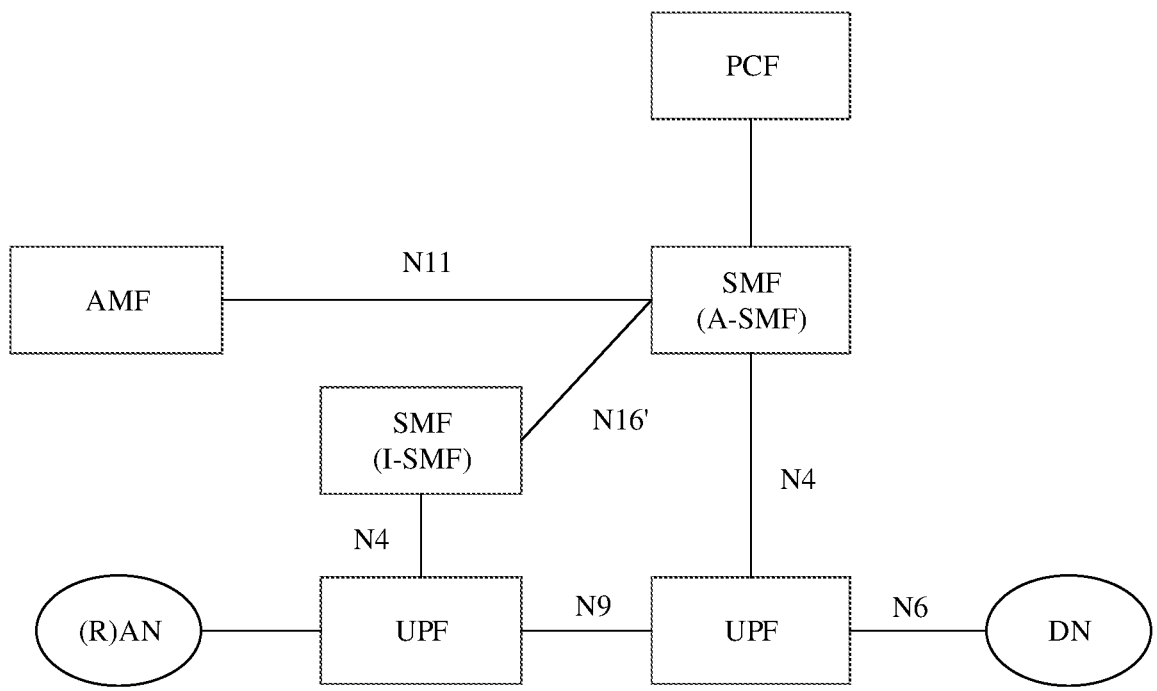
FIG. 2 is a schematic diagram 2 of an application architecture according to an embodiment of this application.

When the first session management network element sends the tunnel information of the user plane function network element (which may be specifically the anchor user plane function network element or the branching point user plane function network element) to the access and mobility management function network element, for the architecture shown in FIG. 1, the first session management network element may directly send the tunnel information of the user plane function network element to the access and mobility management function network element; and for the architecture shown in FIG. 2, the first session management network element sends the tunnel information of the user plane function network element to the second session management network element, and then the second session management network element sends the tunnel information of the user plane function network element to the access and mobility management function network element.

Step 404. The first session management network element sends the IP information of the terminal device to a policy control function network element or the second session management network element.

In this step, the IP information is used to obtain policy information corresponding to the IP information. For example, the first session management network element may send the IP information to the policy control function network element by using an N7 interface, to obtain the policy information corresponding to the IP information from the policy control function network element. Alternatively, the first session management network element may send the IP information to the second session management network element by using an N16 or N16' interface, so that the second session management network element obtains the policy information corresponding to the IP information from the policy control function network element based on the IP information. The policy information corresponding to the IP information may be understood as policy information generated by the policy control function network element based on the IP information. The policy information corresponding to the IP information may include charging information, quality of service (QoS) parameter information, and a routing rule. The QoS parameter information may include at least one of a 5G quality of service identifier (5QI), an allocation and retention priority (ARP), and a per session aggregate maximum bit rate (session-AMBR).

Optionally, the policy information corresponding to the IP information may be classified into policy information related to the terminal device, and/or policy information related to the branching point user plane function network element, and/or policy information related to the access network element. For example, the policy information related to the terminal device may include the routing rule. The policy information related to the branching point user plane function network element may include at least one of the charging information and the session-AMBR. The policy information related to the access network element may include at least one of the session-AMBR, the 5QI, and the ARP.

Further optionally, after obtaining the policy information corresponding to the IP information, the first session management network element may send the policy information related to the terminal device to the terminal device, send the policy information related to the branching point user plane function network element to the second session management network element, and send the policy information related to the access network element to the access network element.

Optionally, before the sending, by the first session management network element, the IP information of the terminal device to a policy control function network element, the method may further include: obtaining, by the first session management network element, an identity of the policy control function network element. Correspondingly, the sending, by the first session management network element, the IP information of the terminal device to a policy control function network element may specifically include: sending, by the first session management network element, the IP information of the terminal device to the policy control function network element based on the identity of the policy control function network element.

Further optionally, the obtaining, by the first session management network element, an identity of the policy control function network element includes: receiving, by the first session management network element, the identity of the policy control function network element from the second session management network element or the access and mobility management function network element.

Optionally, when the first session management network element sends the IP information to the second session management network element, the method may further include the following step 405.

Step 405. The second session management network element obtains the policy information corresponding to the IP information from the policy control function network element based on the IP information.

In this step, for specific descriptions of the policy information corresponding to the IP information, refer to step 404. Details are not described herein again.

Optionally, the session request message includes at least one of the following: an identity of the terminal device, an identity of the first session, a data network name (DNN), and a session and service continuity mode.

It should be noted that, in step 401 to step 405, the second session management network element manages the first session, and some functions (for example, allocating the IP information of the terminal device to the first session and selecting the anchor user plane function network element) of the second session management network element may alternatively be completed by the first session management network element.

Optionally, the method in this embodiment may further include: sending, by the second session management network element, release indication information to the first session management network element, where the release indication information is used to instruct to release the first session; and releasing, by the first session management network element, a user plane resource of the first session and the IP information according to the release indication information. The user plane resource of the first session may include: a cached data packet, a tunnel resource, a session context, and the like.

Optionally, the second session management network element may further assign a management right of the first session to the first session management network element, in other words, the first session management network element manages the first session. Specifically, in this embodiment, the method may further include: sending, by the second session management network element to the first session management network element, the session context of the first session and/or information (information such as the policy information, interface information of the PCF, and an IP address of the session) obtained through interaction with the PCF network element; and sending, by the second session management network element, change indication information to the access and mobility management function network element, where the change indication information is used to indicate that the first session management network element manages the first session. It may alternatively be understood as: the first session management network element sends the change indication information to the policy control function network element. After receiving the session context of the first session, the first session management network element may further store the session context of the first session to complete management of the first session.

The method in this embodiment may further include: releasing, by the first session management network element, the user plane resource of the first session and the IP information when determining that the first session needs to be released.

Optionally, in a scenario of a multi-homed PDU session, the IP information needs to be sent to the terminal device by using a user plane. Therefore, the method in this embodiment may further include: sending, by the first session management network element, the IP information to the terminal device by using the user plane. Optionally, the first session management network element may actively send the IP information to the terminal device; or the first session management network element may send the IP information to the terminal device according to an instruction of the second session management network element. Optionally, before the sending, by the first session management network element, the IP information to the terminal device by using the user plane, the method may further include: sending, by the second session management network element, sending indication information to the first session management network element, where the sending indication information is used to instruct the first session management network element to send the IP information to the terminal device; and receiving, by the first session management network element, the sending indication information from the second session management network element.

According to the session management method provided in this application, after determining to newly establish the first session, the second session management network element sends the session request message to the first session management network element; and the first session management network element allocates the IP information of the terminal device to the first session based on the session request message, and sends the IP information to the policy control function network element or the second session management network element, where the IP information is used to obtain the policy information corresponding to the IP information, so that the first session management network element and the second session management network element cooperate with each other to implement session management.

Figures 1, 5A:
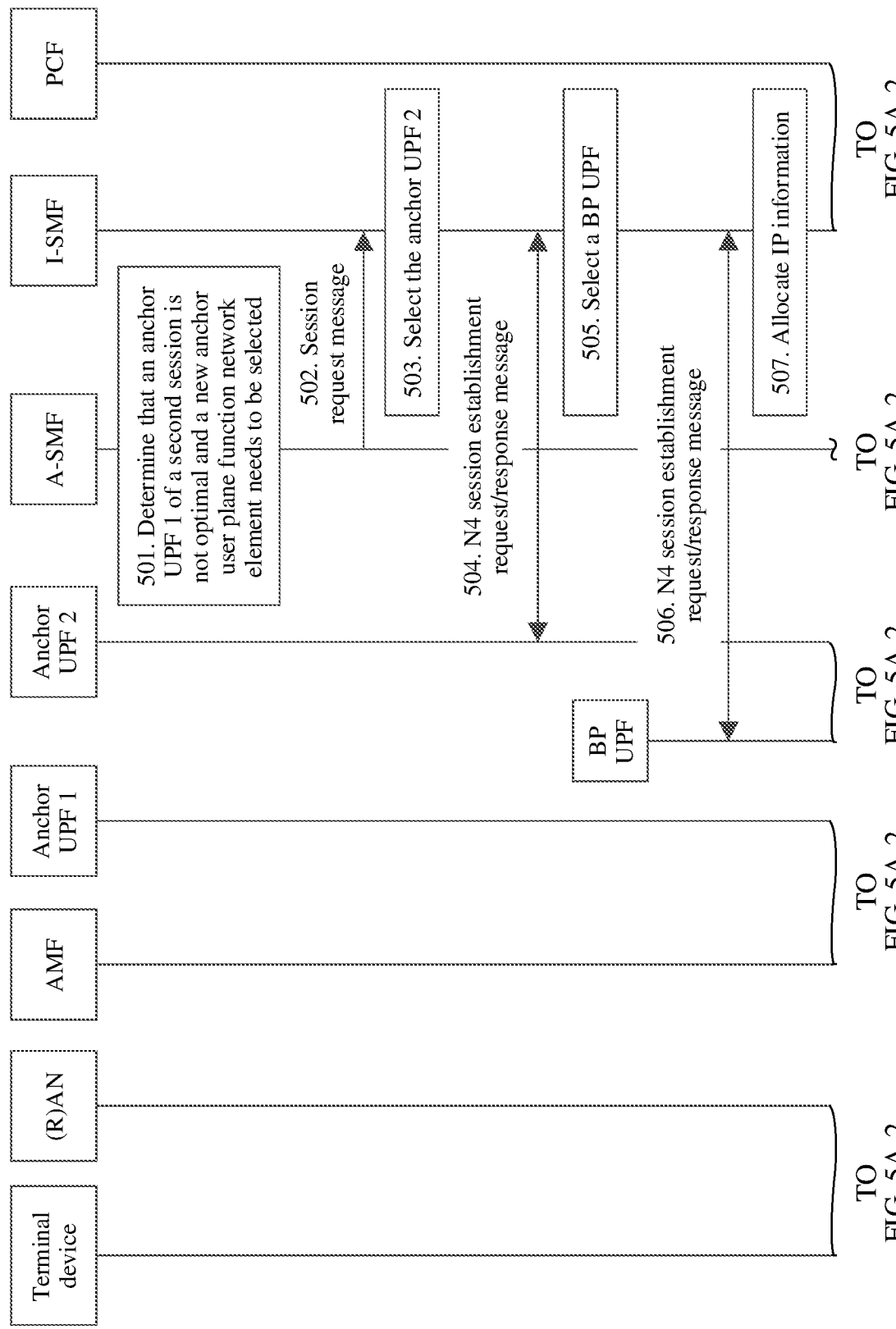
Figures 2, 5A:
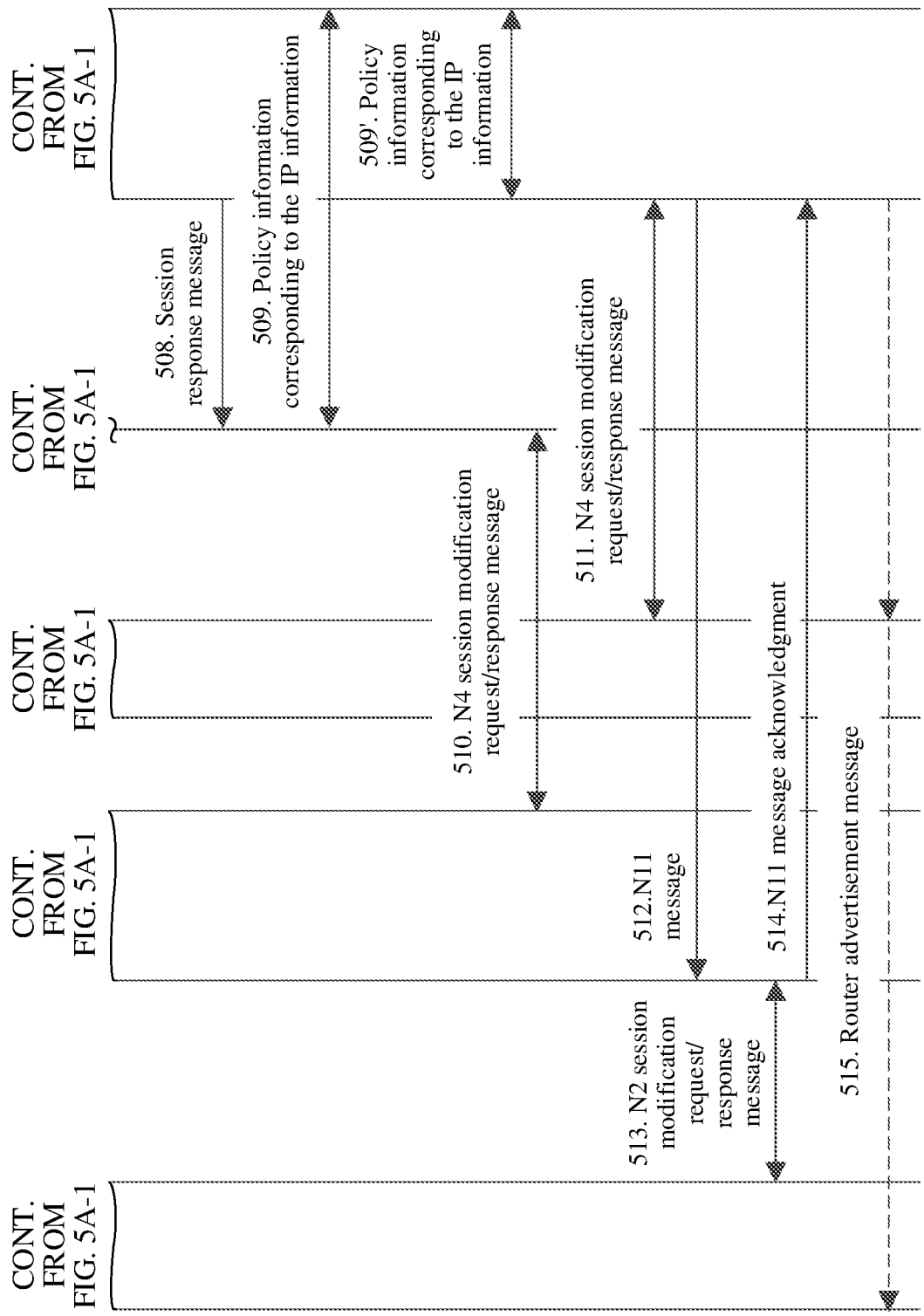
Figure 6:
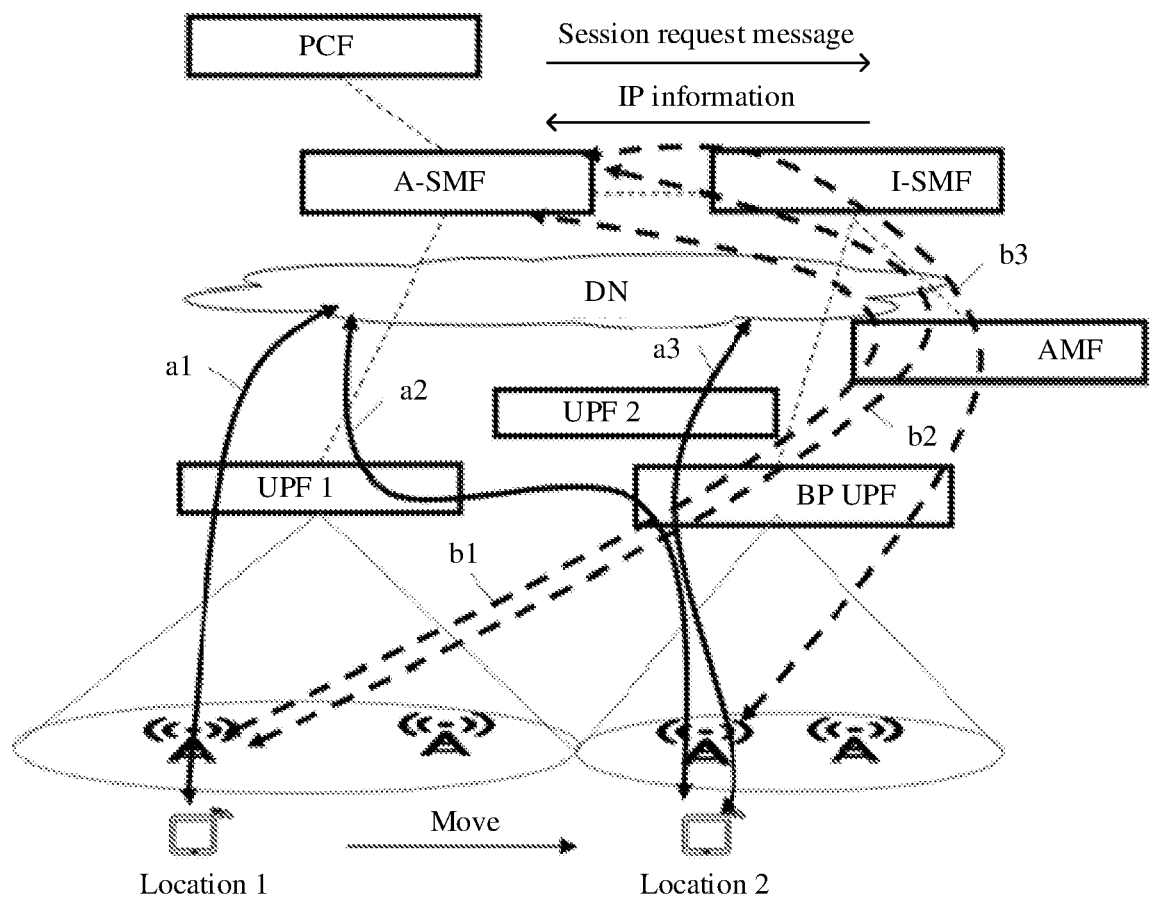
FIG. 6 is a schematic diagram of the session management method according to the another embodiment of this application.

FIG. 5A-1 and FIG. 5A-2 are a flowchart of a session management method according to another embodiment of this application; and FIG. 6 is a schematic diagram of the session management method according to the another embodiment of this application. This embodiment uses the architecture shown in FIG. 1 as an example: A first session management network element is an I-SMF network element, a second session management network element is an A-SMF network element, and the first session management network element selects an anchor user plane function network element and a branching point user plane function network element for a first session and allocates IP information of a terminal device to the first session. In this embodiment, the first session may be understood as a branch of a second session. As shown in FIG. 5A-1 and FIG. 5A-2, and FIG. 6, the method in this embodiment may include the following steps.

Step 501. The second session management network element determines that an anchor user plane function network element anchor UPF 1 of the second session is not preferred and a new anchor user plane function network element needs to be selected.

In this step, as shown in FIG. 6, the terminal device establishes a session at a location 1 by using a control plane path b1, and a1 in FIG. 6 represents a data path of the session. When moving from the location 1 to a location 2, the terminal device completes session handover by using a control plane path b2, and a2 in FIG. 6 represents a data path of the session (namely, the second session) after the handover. In a session handover process, a user plane function network element directly connected to an access network element is not within a service area of the A-SMF, and is managed by the I-SMF. In this case, the second session management network element determines that the anchor user plane function network element anchor UPF 1 of the second session is not preferred and the new anchor user plane function network element needs to be selected. The second session management network element selects the new anchor user plane function network element to establish a branch, for example, the first session, for the second session. The first session and the second session may coexist, or only the first session may be established. In a possible implementation, the second session management network element determines, based on at least one of the following information, that the anchor user plane function network element anchor UPF 1 of the second session is not preferred: location information of the terminal device, a request for an application function (AF), a load status of the SMF, and that the terminal device moves out of a service area of the anchor UPF.

Step 502. The second session management network element sends a session request message to the first session management network element.

In this step, in the session handover process, the second session management network element needs to insert a user plane network element that is not within the service area of the second session management network element, that is directly connected to the access network element corresponding to the first session. Therefore, the second session management network element stores information about the first session management network element, for example, an identity (ID) of the first session management network element. The second session management network element may send the session request message to the first session management network element based on the ID of the first session management network element. The session request message is used to request to establish the first session, namely, a branch of the second session.

Step 503. The first session management network element selects an anchor user plane function network element (anchor UPF 2) for the first session based on the session request message.

Step 504. The first session management network element sends an N4 session establishment request message to the anchor UPF 2 network element, and receives an N4 session establishment response message returned by the anchor UPF 2.

It should be noted that tunnel information of the anchor UPF 2 network element may be allocated by the first session management network element or the anchor UPF 2 network element. When the tunnel information is allocated by the first session management network element, the first session management network element may add the tunnel information of the anchor UPF 2 network element to the N4 session establishment request message in this step. When the tunnel information is allocated by the anchor UPF 2 network element, the anchor UPF 2 network element may add the tunnel information of the anchor UPF 2 network element to the N4 session establishment response message in this step. In this step, the N4 session establishment request message may further include information, such as packet detection, UPF execution, and reporting rules, that is provided for the anchor UPF 2 network element.

Step 505. The first session management network element selects a branching point user plane function BP UPF network element for the first session based on the session request message.

Step 506. The first session management network element sends an N4 session establishment request message to the BP UPF network element, and receives an N4 session establishment response message returned by the BP UPF.

It should be noted that tunnel information of the BP UPF network element may be allocated by the first session management network element or the BP UPF network element. When the tunnel information is allocated by the first session management network element, the first session management network element may add the tunnel information of the BP UPF network element to the N4 session establishment request message in this step. When the tunnel information is allocated by the BP UPF network element, the BP UPF network element may add the tunnel information of the BP UPF network element to the N4 session establishment response message in this step. In this step, the N4 session establishment request message further needs to carry the tunnel information of the anchor UPF 2 network element. The N4 session establishment request message may further include information, such as an uplink/downlink data transport rule and tunnel information of a (R)AN, that is provided for the BP UPF network element.

Step 507. The first session management network element allocates the IP information of the terminal device to the first session based on the session request message.

It should be noted that a sequence of step 507 and steps 503 to 506 is not limited. When step 507 is performed after step 503, in step 507, the IP information of the terminal device may be specifically allocated to the first session based on the anchor UPF 2 network element selected in step 503.

Step 508. The first session management network element sends a session response message to the second session management network element.

In this step, the session response message includes the IP information. Optionally, when the BP UPF network element selected in step 505 and the user plane function network element that is directly connected to the access network (R)AN element and that corresponds to the first session are different network elements, the session response message may further include the tunnel information of the BP UPF network element. When the BP UPF network element selected in step 505 and the user plane function network element that is directly connected to the (R)AN element and that corresponds to the first session are a same network element, because the (R)AN element has learned of tunnel information of the user plane function network element that is directly connected to the (R)AN element and that corresponds to the first session, the session response message does not need to include the tunnel information of the BP UPF network element.

Step 509. The second session management network element obtains policy information corresponding to the IP information from a PCF network element based on the IP information.

In this step, specifically, the second session management network element sends the IP information to the PCF network element, and the PCF network element returns the policy information corresponding to the IP information to the second session management network element based on the IP information.

Step 510. The second session management network element sends an N4 session modification request message to the anchor UPF 1 network element, and receives an N4 session modification response message returned by the anchor UPF 1.

In this step, the N4 session modification request message carries the tunnel information of the BP UPF network element, to notify the anchor UPF 1 network element of the tunnel information of the BP UPF network element. It should be noted that, when the session response message includes the tunnel information of the BP UPF network element, step 510 is performed. When the session response message does not include the tunnel information of the BP UPF network element, step 510 is not performed.

Step 511. The first session management network element sends an N4 session modification request message to the anchor UPF 2 network element, and receives an N4 session modification response message returned by the anchor UPF 2.

In this step, the N4 session modification request message carries the tunnel information of the BP UPF network element, to notify the anchor UPF 2 network element of the tunnel information of the BP UPF network element.

It should be noted that a sequence of step 511, step 510, step 509, and step 506 is not limited. Step 511 may be performed after step 506.

Step 512. The first session management network element sends an N11 message to an AMF network element.

In this step, the N11 message carries the tunnel information of the BP UPF network element. It should be noted that, when the BP UPF network element selected in step 505 and the user plane function network element that is directly connected to the (R)AN element and that corresponds to the first session are different network elements, step 512 is performed. When the BP UPF network element selected in step 505 and the user plane function network element that is directly connected to the (R)AN element and that corresponds to the first session are a same network element, because the (R)AN element has learned of the tunnel information of the user plane function network element that is directly connected to the (R)AN element and that corresponds to the first session, step 512 does not need to be performed.

Step 513. The AMF network element sends an N2 session modification request message to the (R)AN element based on the N11 message, and receives an N2 session modification response message returned by the (R)AN element.

In this step, the N2 session modification request message carries the tunnel information of the BP UPF network element. It should be noted that step 513 is triggered by step 512, and step 513 is not performed when step 512 is not performed.

Step 514. The AMF returns an N11 message acknowledgment (N11 message Ack) to the first session management network element based on the N2 session modification response message.

Step 515. The first session management network element sends a router advertisement message to the terminal device by using the anchor UPF 2 network element.

In this step, the router advertisement message carries the IP information.

It should be noted that, in the foregoing descriptions of this embodiment, an example in which the first session management network element sends the IP information to the second session management network element and the IP information is used by the second session management network element to obtain the policy information corresponding to the IP information is used. Specifically, in step 508, the first session management network element sends the session response message including the IP information to the second session management network element. In step 509, the second session management network element obtains the policy information corresponding to the IP information from the PCF network element based on the IP information.

Alternatively, the first session management network element may send the IP information to the PCF network element, and the IP information is used by the first session management network element to obtain the policy information corresponding to the IP information. Specifically, step 509 in FIG. 5A-1 and FIG. 5A-2 is replaced with step 509'. Correspondingly, the session response message in step 508 may not include the IP information.

Step 509'. The first session management network element obtains the policy information corresponding to the IP information from the PCF network element based on the IP information.

In this step, it should be noted that step 509' may be performed after step 507, and a sequence of step 509' and step 508 is not limited. Further optionally, the first session management network element may obtain an identity of the PCF before step 509' in the procedure for newly establishing the branch that is shown in FIG. 5A-1 and FIG. 5A-2. For example, in step 502, the session request message from the second session management network element to the first session management network element may include the identity of the PCF network element. Alternatively, the first session management network element may obtain the identity of the PCF network element in an insertion procedure of the first session management network element that is shown in FIG. 5B.

Figure 5B:
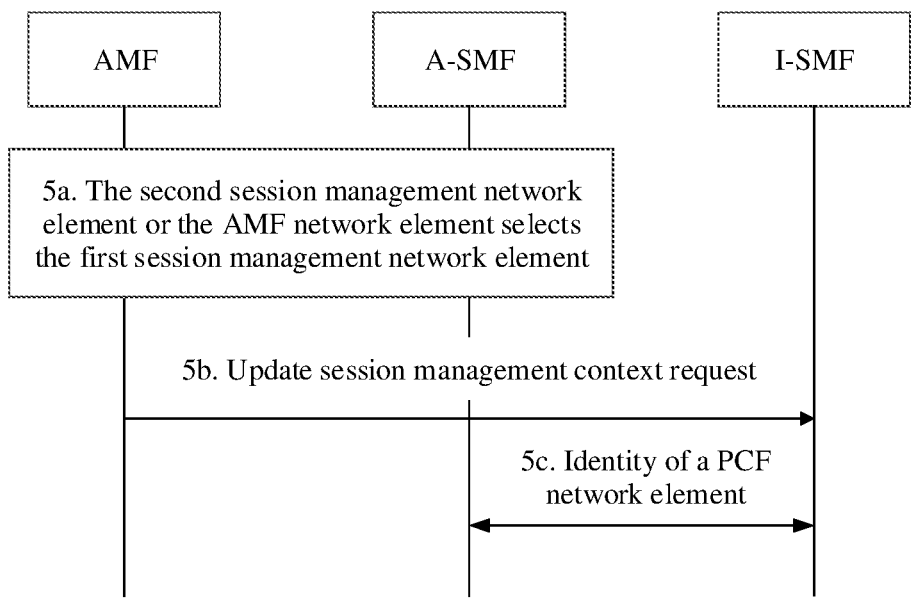
FIG. 5B is a flowchart of an insertion procedure according to the another embodiment of this application.

As shown in FIG. 5B, the insertion procedure of the first session management network element may include the following steps.

Step 5a. The second session management network element or the AMF network element selects the first session management network element.

In this step, optionally, the AMF network element may be self-triggered to select the first session management network element. Alternatively, the second session management network element may trigger the AMF network element to select the first session management network element. Alternatively, the second session management network element may be self-triggered to select the first session management network element. For example, the AMF network element may determine, based on a location of the terminal device and the service area (SA) of the second session management network element, to trigger selection of a session management network element, and select the first session management network element. Alternatively, the second session management network element may determine, based on a location of the terminal device and the service area of the second session management network element, to trigger selection of a session management network element, and send a notification message to the AMF network element, to instruct the AMF network element to select the session management network element; and the AMF network element selects the first session management network element.

Alternatively, the second session management network element may determine, based on a location of the terminal device and the service area of the second session management network element, to trigger selection of a session management network element, and select the first session management network element.

Step 5b. The AMF network element sends an update session management context request to the first session management network element.

In this step, the update session management context request is used to trigger the first session management network element to select an I-UPF network element. The I-UPF network element may be a user plane function network element directly connected to the (R)AN element. Optionally, the update session management context request may further include the identity of the PCF network element.

Optionally, when the update session management context request includes the identity of the PCF network element, the AMF network element may obtain the identity of the PCF network element in the following manner:

When the AMF network element is self-triggered to select the first session management network element, if the PCF network element connected to the AMF network element provides a policy on a terminal device granularity, and the policy on the terminal device granularity is different from a policy on a session granularity, the AMF network element may obtain the identity of the PCF network element from the second session management network element before selecting the first session management network element. If the policy on the terminal device granularity is the same as the policy on the session granularity, the AMF network element may not need to obtain the identity of the PCF network element from the second session management network element. In addition, the AMF network element may obtain the identity of the first session management network element after selecting the first session management network element, and therefore, may send the update session management context request to the first session management network element.

When the second session management network element triggers the AMF network element to select the first session management network element, the notification message from the second session management network element to the AMF network element may carry the identity of the PCF network element.

When the second session management network element is self-triggered to select the first session management network element, after selecting the first session management network element, the second session management network element may send the identity of the first session management network element and the identity of the PCF network element to the AMF network element.

Optionally, when the update session management context request does not include the identity of the PCF network element, the first session management network element may obtain the identity of the PCF network element in the following step 5c.

Step 5c. The first session management network element obtains the identity of the PCF network element from the second session management network element.

In this step, for example, the first session management network element sends an identity obtaining request to the second session management network element, to request the identity of the PCF network element. Further, the first session management network element receives an identity obtaining response from the second session management network element and that includes the identity of the PCF network element.

It should be noted that, after step 5c, the insertion procedure of the first session management network element may further include other steps, for example, that the first session management network element inserts the I-UPF network element and establishes user plane connections between the (R)AN element, the anchor UPF 1 network element, and the I-UPF network element.

It should be noted that, the insertion procedure of the first session management network element may be performed before the procedure for newly establishing the branch that is shown in FIG. 5A-1 and FIG. 5A-2.

It should be noted that after obtaining the identity of the PCF network element, the second session management network element may store the identity of the PCF network element.

As shown in FIG. 6, when moving to the location 2, the terminal device completes establishment of the first session, namely, the branch of the second session, by using a control plane path b3, and a3 in FIG. 6 represents a data path of the established branch of the second session. In this case, a2 serves as a data path of another branch of the second session. For simplification, in FIG. 6, an example in which the selected BP UPF network element and a user plane function network element that is directly connected to the (R)AN element and that corresponds to the second session are a same network element is used, and the BP UPF network element is denoted as BP UPF in the figure.

According to the session management method provided in this application, the second session management network element sends the session request message to the first session management network element; and the first session management network element selects the anchor user plane function network element and the branching point user plane function network element for the first session and allocates the IP information of the terminal device based on the session request message, to establish the branch of the session in a scenario of two session management network elements. In addition, it can be learned from FIG. 6 that the newly established branch of the second session is still managed by the second session management network element. Therefore, session information and a peripheral interface of the second session management network element may be reused, for example, a policy and charging control (PCC) policy and an IP address of the PCF are reused, eliminating a DN authorization process.

Figures 1, 7A:
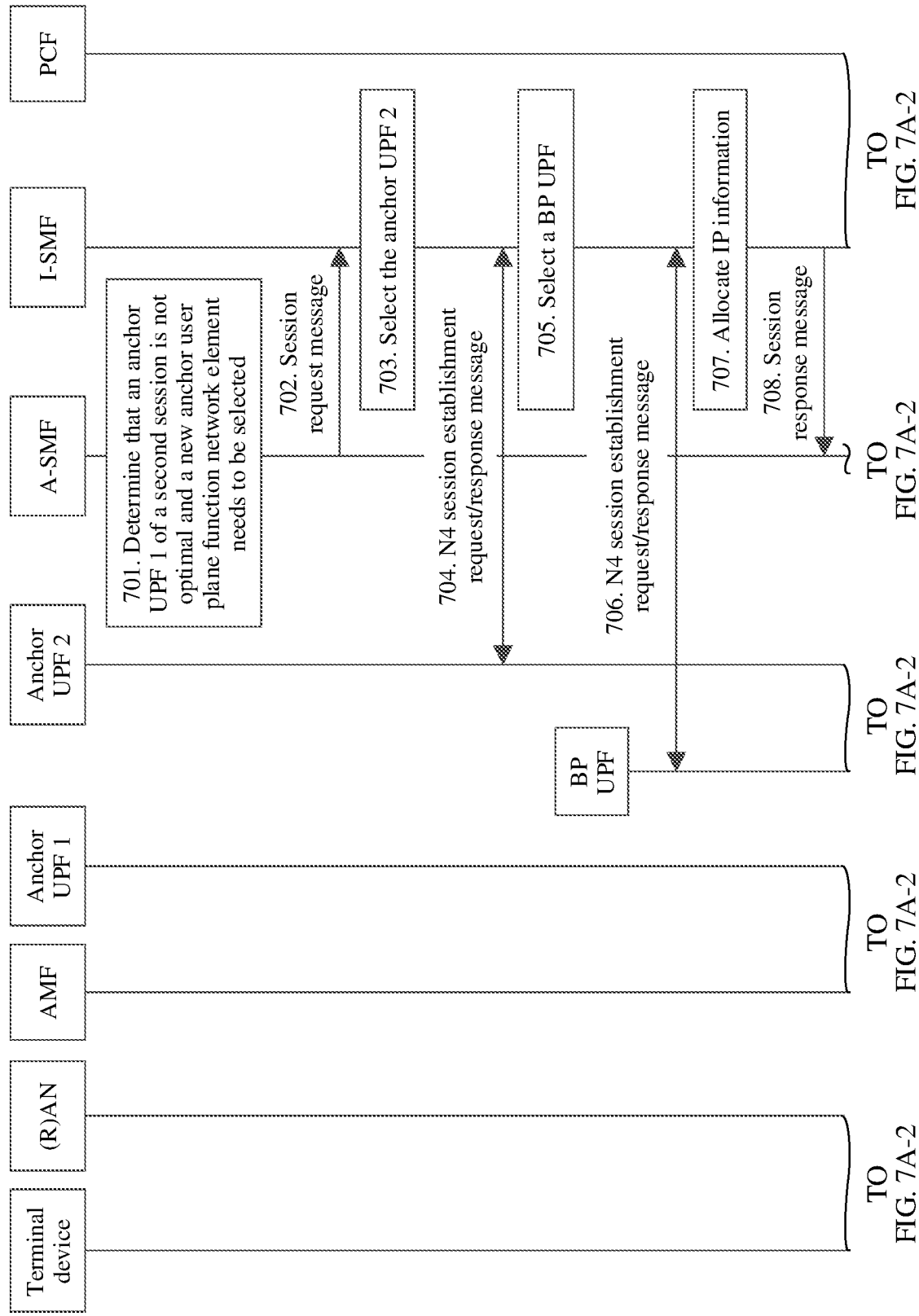
Figures 2, 7A:
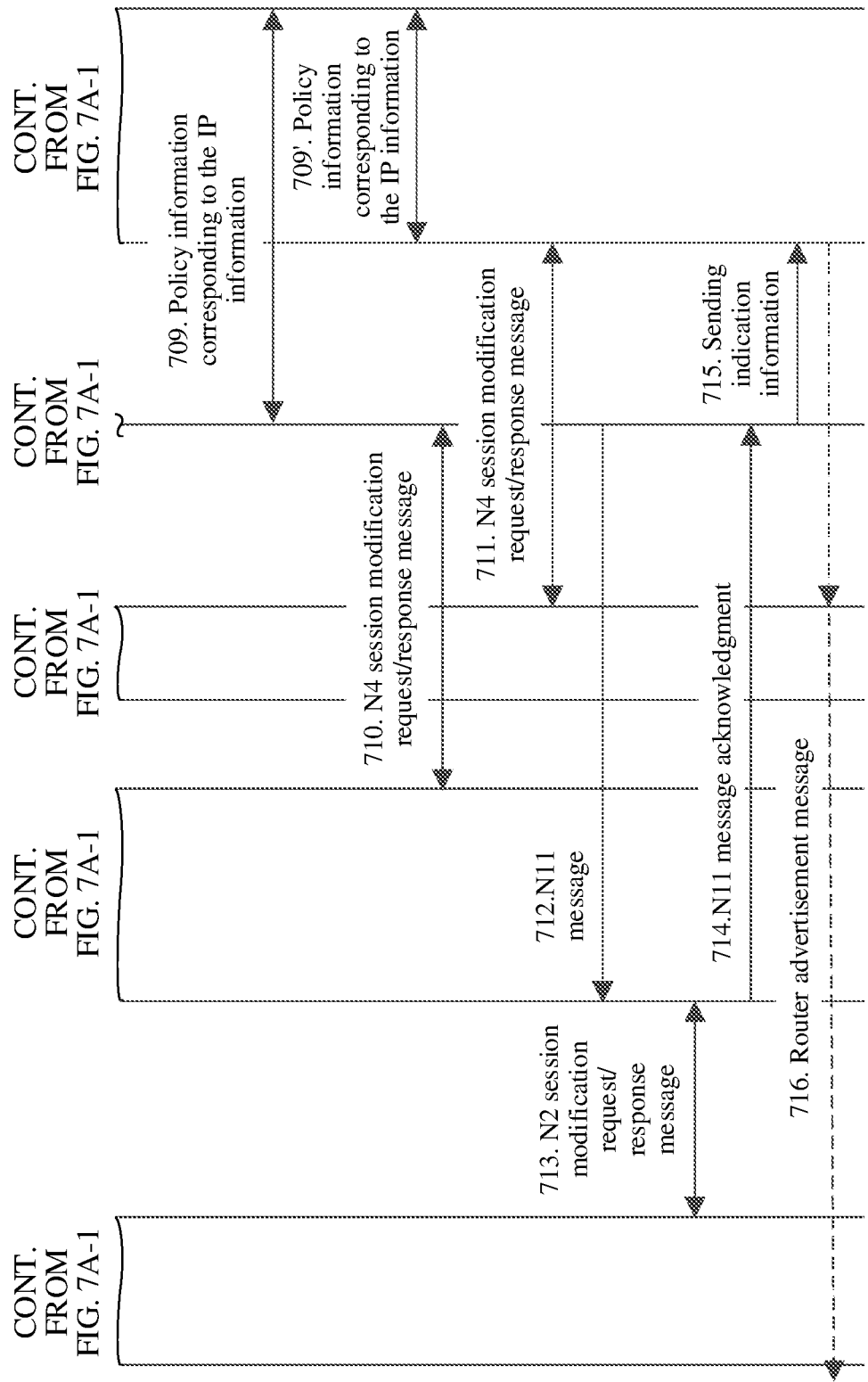
Figure 8:
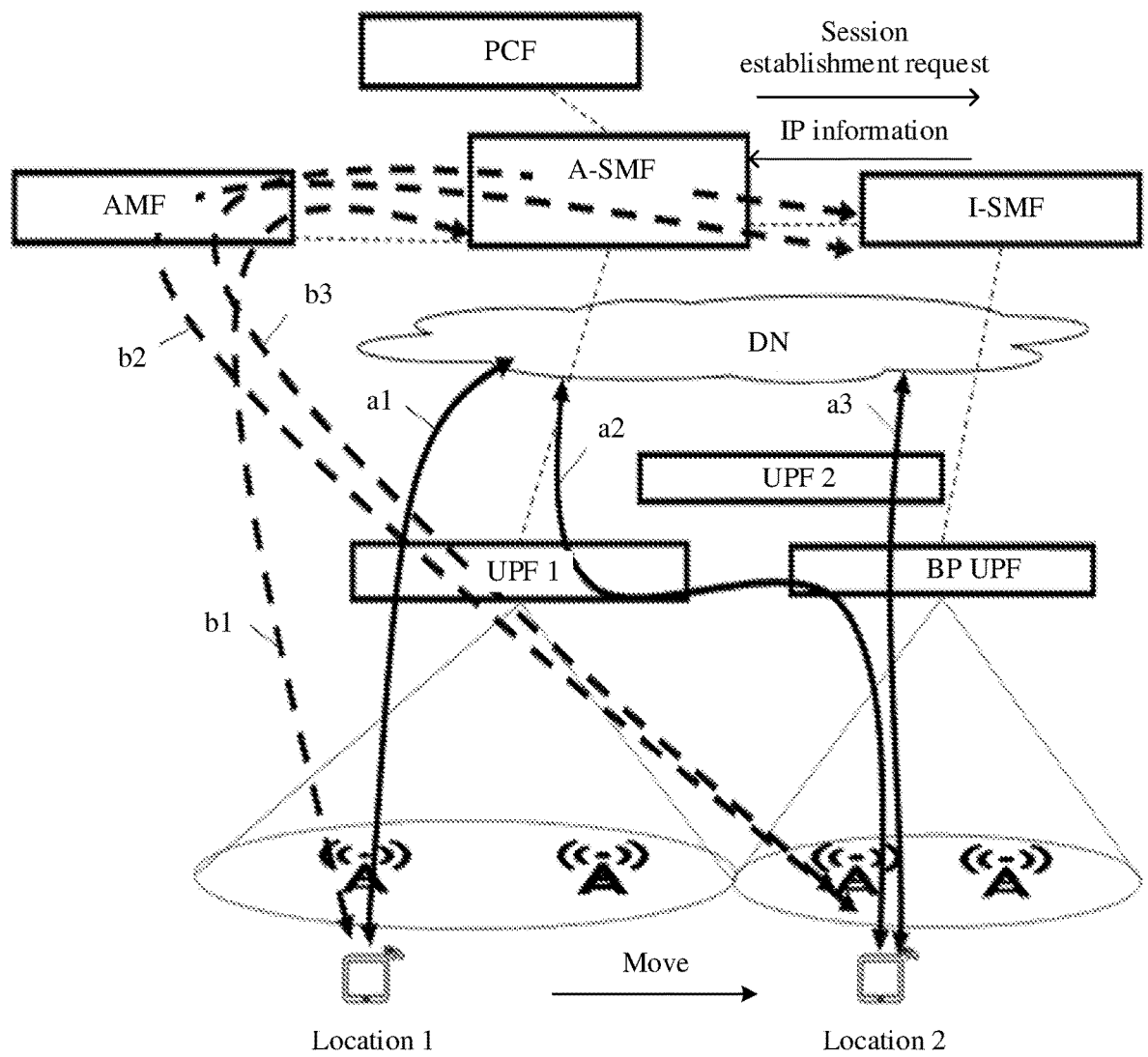
FIG. 8 is a schematic diagram of the session management method according to the still another embodiment of this application.

FIG. 7A-1 and FIG. 7A-2 are a flowchart of a session management method according to still another embodiment of this application; and FIG. 8 is a schematic diagram of the session management method according to the still another embodiment of this application. This embodiment uses the architecture shown in FIG. 2 as an example: A first session management network element is an I-SMF network element, a second session management network element is an A-SMF network element, and the first session management network element selects an anchor user plane function network element and a branching point user plane function network element for a first session and allocates IP information of a terminal device to the first session. In this embodiment, the first session may be understood as a branch of a second session. In this embodiment, for same content, refer to the descriptions in the embodiment in FIG. 5A-1 and FIG. 5A-2, and FIG. 6. As shown in FIG. 7A-1 and FIG. 7A-2, and FIG. 8, the method in this embodiment may include the following steps.

Step 701. The second session management network element determines that an anchor user plane function network element anchor UPF 1 of the second session is not preferred and a new anchor user plane function network element needs to be selected.

Step 702. The second session management network element sends a session request message to the first session management network element.

The session request message is used to request to establish the first session, namely, a branch of the second session.

Step 703. The first session management network element selects an anchor user plane function network element (anchor UPF 2) for the first session based on the session request message.

Step 704. The first session management network element sends an N4 session establishment request message to the anchor UPF 2 network element, and receives an N4 session establishment response message returned by the anchor UPF 2.

Step 705. The first session management network element selects a branching point user plane function BP UPF network element for the first session based on the session request message.

Step 706. The first session management network element sends an N4 session establishment request message to the BP UPF network element, and receives an N4 session establishment response message returned by the BP UPF.

Step 707. The first session management network element allocates the IP information of the terminal device to the first session based on the session request message.

Step 708. The first session management network element sends a session response message to the second session management network element.

Step 709. The second session management network element obtains policy information corresponding to the IP information from a PCF network element based on the IP information.

Step 710. The second session management network element sends an N4 session modification request message to the anchor UPF 1 network element, and receives an N4 session modification response message returned by the anchor UPF 1.

Step 711. The first session management network element sends an N4 session modification request message to the anchor UPF 2 network element, and receives an N4 session modification response message returned by the anchor UPF 2.

It should be noted that step 701 to step 711 are similar to step 501 to step 511, and details are not described herein again.

Step 712. The second session management network element sends an N11 message to an AMF network element.

In this step, the N11 message carries tunnel information of the BP UPF network element. It should be noted that, when the BP UPF network element selected in step 705 and a user plane function network element that is directly connected to a (R)AN element and that corresponds to the first session are different network elements, step 712 is performed. When the BP UPF network element selected in step 705 and a user plane function network element that is directly connected to a (R)AN element and that corresponds to the first session are a same network element, because the (R)AN element has learned of tunnel information of the user plane function network element that is directly connected to the (R)AN element and that corresponds to the first session, step 712 does not need to be performed.

Step 713. The AMF network element sends an N2 session modification request message to the (R)AN element based on the N11 message, and receives an N2 session modification response message returned by the (R)AN element.

In this step, the N2 session modification request message carries the tunnel information of the BP UPF network element. It should be noted that step 713 is triggered by step 712, and step 713 is not performed when step 712 is not performed.

Step 714. The AMF returns an N11 message acknowledgment to the second session management network element based on the N2 session modification response message.

Step 715. The second session management network element sends sending indication information to the first session management network element.

In this step, the sending indication information is used to instruct the first session management network element to send the IP information to the terminal device.

Step 716. The first session management network element sends a router advertisement message to the terminal device by using the anchor UPF 2 network element.

In this step, the router advertisement message carries the IP information.

It should be noted that, in the foregoing descriptions of this embodiment, an example in which the first session management network element sends the IP information to the second session management network element and the IP information is used by the second session management network element to obtain the policy information corresponding to the IP information is used. Specifically, in step 708, the first session management network element sends the session response message including the IP information to the second session management network element. In step 709, the second session management network element obtains the policy information corresponding to the IP information from the PCF network element based on the IP information.

Alternatively, the first session management network element may send the IP information to the PCF network element, and the IP information is used by the first session management network element to obtain the policy information corresponding to the IP information. Specifically, step 709 in FIG. 7A-i and FIG. 7A-2 is replaced with step 709'. Correspondingly, the session response message in step 708 may not include the IP information.

Step 709'. The first session management network element obtains the policy information corresponding to the IP information from the PCF network element based on the IP information.

In this step, it should be noted that step 709' may be performed after step 707, and a sequence of step 709' and step 708 is not limited. Further optionally, the first session management network element may obtain an identity of the PCF before step 709' in the procedure for newly establishing the branch that is shown in FIG. 7A-1 and FIG. 7A-2. For example, in step 702, the session request message from the second session management network element to the first session management network element may include the identity of the PCF network element. Alternatively, the first session management network element may obtain the identity of the PCF network element in an insertion procedure of the first session management network element that is shown in FIG. 7B.

Figure 7B:
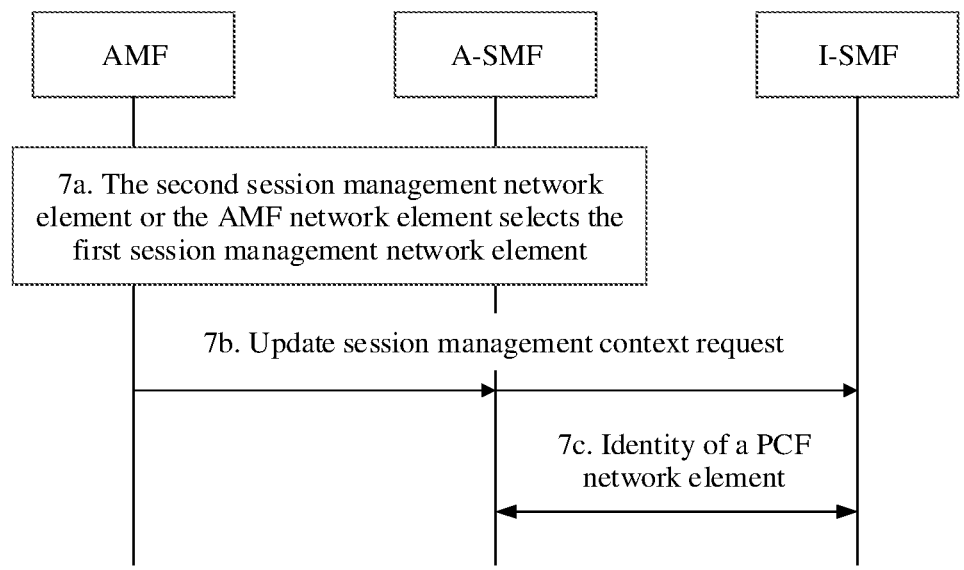
FIG. 7B is a flowchart of an insertion procedure according to the still another embodiment of this application; [our]

As shown in FIG. 7B, the insertion procedure of the first session management network element may include the following steps.

Step 7a. The second session management network element or the AMF network element selects the first session management network element.

It should be noted that step 7a is similar to step 5a, and details are not described herein again.

Step 7b. The AMF network element sends an update session management context request to the first session management network element by using the second session management network element.

It should be noted that a main difference between step 7b and step 5b lies in: In step 7b, the AMF network element needs to send the update session management context request to the first session management network element by using the second session management network element. For other content, refer to step 5b, and details are not described herein again.

Step 7c. The first session management network element obtains the identity of the PCF network element from the second session management network element.

It should be noted that step 7c is similar to step 5c, and details are not described herein again.

It should be noted that, after step 7c, the insertion procedure of the first session management network element may further include other steps, for example, that the first session management network element inserts an I-UPF network element and establishes user plane connections between the (R)AN element, the anchor UPF 1 network element, and the I-UPF network element.

It should be noted that, the insertion procedure of the first session management network element may be performed before the procedure for newly establishing the branch that is shown in FIG. 7A-1 and FIG. 7A-2.

It should be noted that after obtaining the identity of the PCF network element, the second session management network element may store the identity of the PCF network element.

According to the session management method provided in this application, the second session management network element sends the session request message to the first session management network element; and the first session management network element selects the anchor user plane function network element and the branching point user plane function network element for the first session and allocates the IP information of the terminal device based on the session request message, to establish the branch of the session in a scenario of two session management network elements. In addition, it can be learned from FIG. 8 that the newly established branch of the second session is still managed by the second session management network element. Therefore, session information and a peripheral interface of the second session management network element may be reused, for example, a PCC policy and an IP address of the PCF are reused, eliminating a DN authorization process.

It should be noted that a difference between the embodiment shown in FIG. 7A-1 and FIG. 7A-2, and FIG. 8 and the embodiment shown in FIG. 5A-1 and FIG. 5A-2, and FIG. 6 mainly lies in different application architectures. Specifically, in the embodiment shown in FIG. 5A-1 and FIG. 5A-2, and FIG. 6, there is an interface between the first session management network element and the access and mobility management function network element, there is an interface between the second session management network element and the access and mobility management function network element before the session handover, and there is an interface between the first session management network element and the access and mobility management function network element after the session handover. In the embodiment shown in FIG. 7A-1 and FIG. 7A-2, and FIG. 8, there is an interface between the second session management network element and the access and mobility management function network element. Therefore, in the embodiment shown in FIG. 5A-1 and FIG. 5A-2, and FIG. 6, the first session management network element sends the N11 message to the access and mobility management function network element; in the embodiment shown in FIG. 7A-i and FIG. 7A-2, and FIG. 8, the second session management network element sends the N11 message to the access and mobility management function network element. In addition, in the embodiment shown in FIG. 7A-1 and FIG. 7A-2, and FIG. 8, because the access and mobility management network element interacts with the second session management network element, the second session management network element needs to send the sending indication information to the first session management network element, so that the first session management network element sends, to the terminal device, the router advertisement message carrying the IP information after receiving the sending indication information.

Figure 9A:
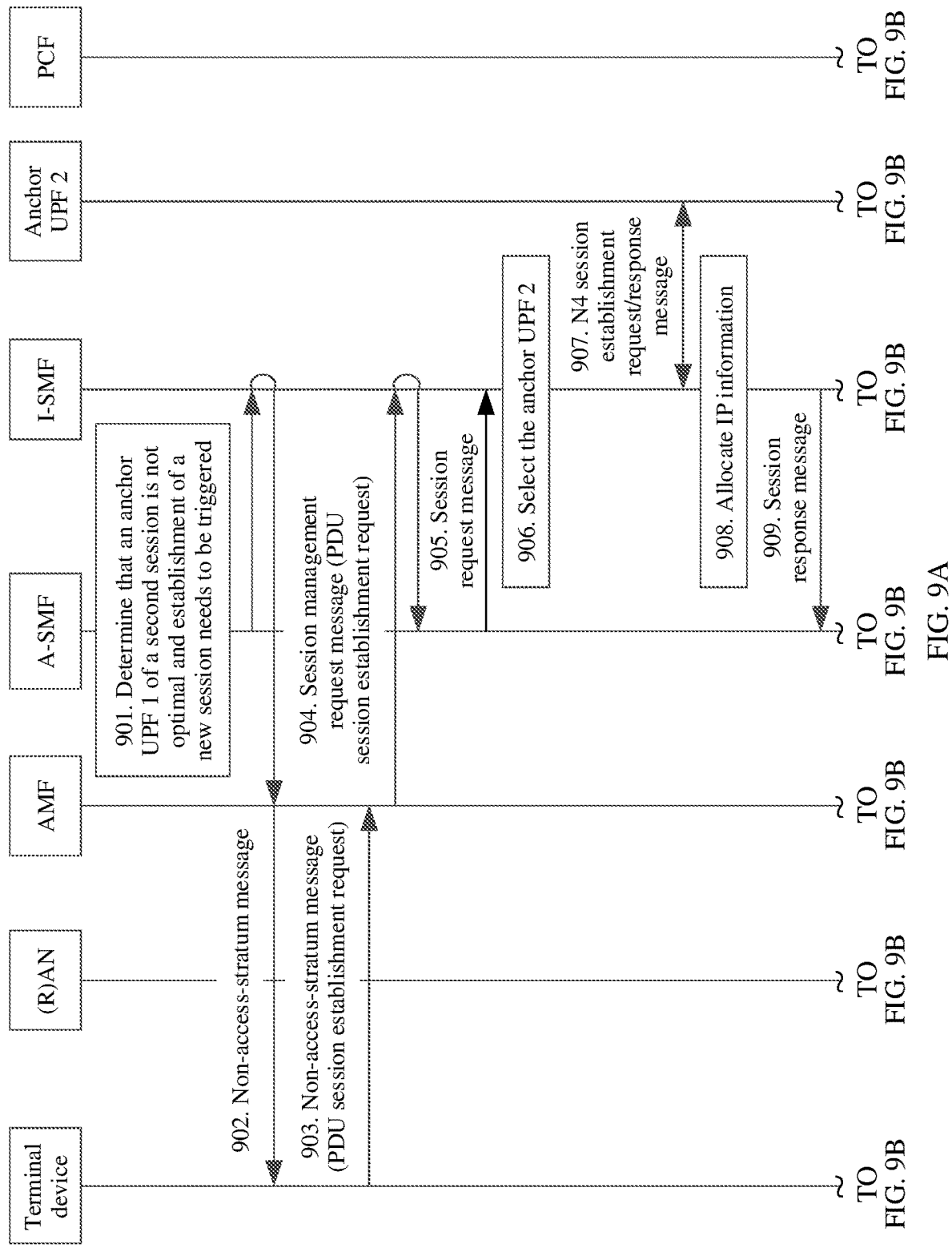
FIG. 9A and FIG. 9B are a flowchart of a session management method according to still another embodiment of this application.
Figure 9B:
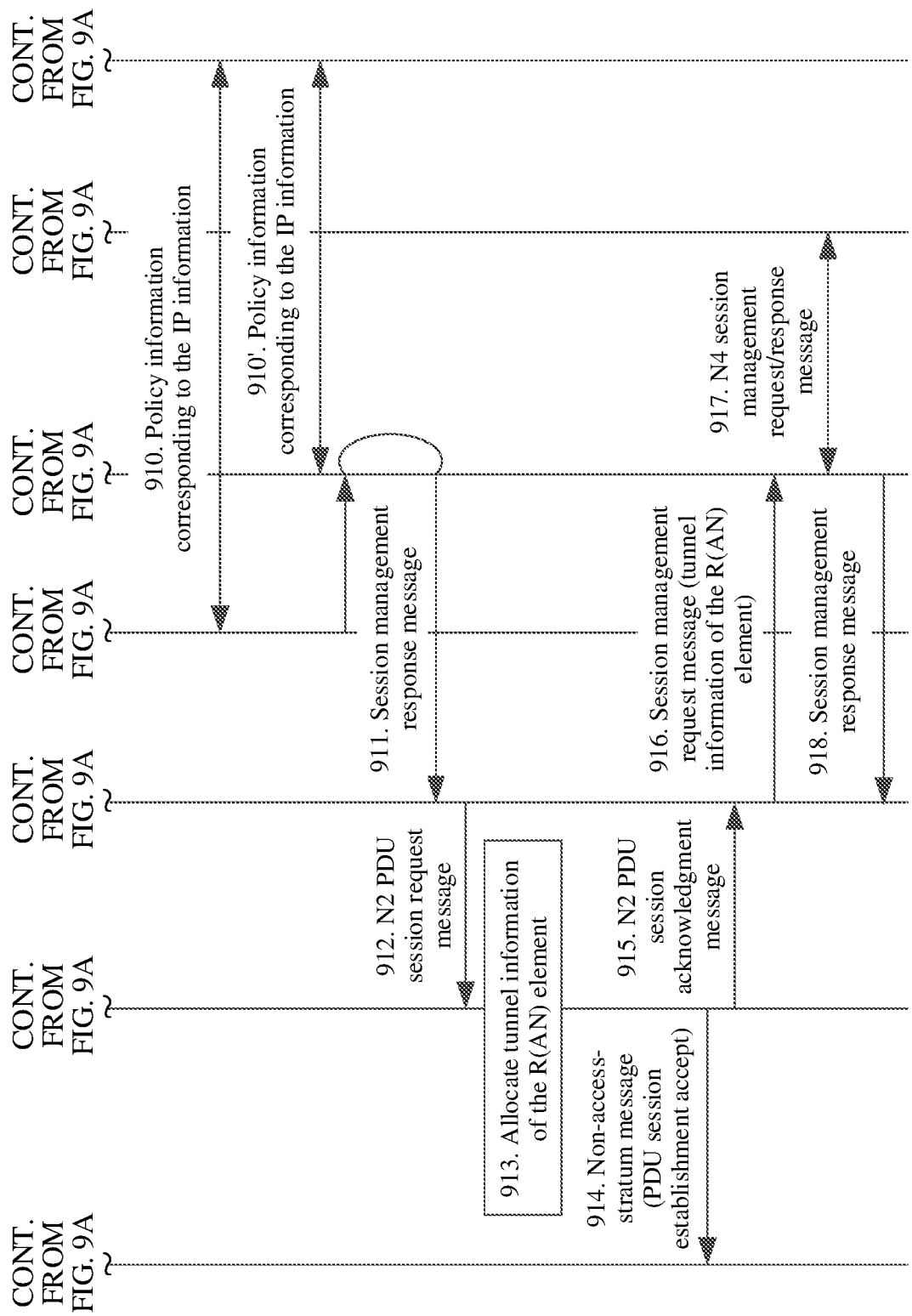
Figure 10:
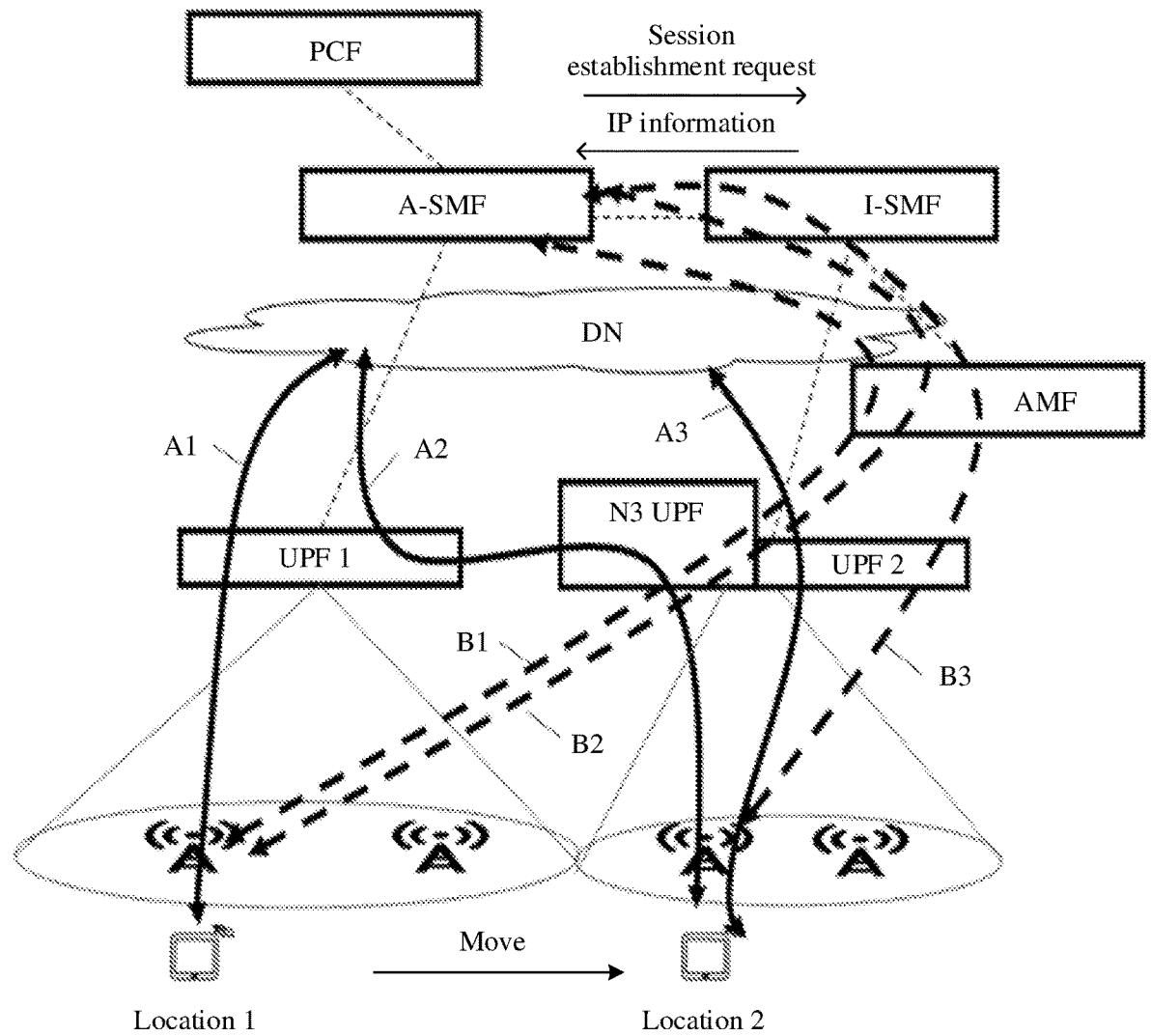
FIG. 10 is a schematic diagram of the session management method according to the still another embodiment of this application.

FIG. 9A and FIG. 9B are a flowchart of a session management method according to still another embodiment of this application; and FIG. 10 is a schematic diagram of the session management method according to the still another embodiment of this application. This embodiment uses the architecture shown in FIG. 1 as an example: A first session management network element is an I-SMF network element, a second session management network element is an A-SMF network element, the first session management network element selects an anchor user plane function network element for a first session and allocates IP information of a terminal device to the first session, and the first session and a second session are different sessions. As shown in FIG. 9A and FIG. 9B, and FIG. 10, the method in this embodiment may include the following steps.

Step 901. The second session management network element determines that an anchor user plane function network element anchor UPF 1 of the second session is not preferred and establishment of a new session needs to be triggered.

In this step, as shown in FIG. 10, the terminal device establishes a session at a location 1 by using a control plane path B1, and A1 in FIG. 6 represents a data path of the session. When moving from the location 1 to a location 2, the terminal device completes session handover by using a control plane path B2, and A2 in FIG. 10 represents a data path of a session (namely, the second session) obtained after the handover. In this case, the second session management network element determines that the anchor user plane function network element anchor UPF 1 of the second session is not preferred and the establishment of the new session needs to be triggered. It should be noted that an N3 UPF network element in FIG. 10 represents a user plane function network element directly connected to an access network element after the session handover. The N3 UPF network element is not within a service area of the second session management network element and is managed by the first session management network element. In a possible implementation, the first session and the second session may coexist, or only the first session may be established. The second session management network element determines, based on at least one of the following information, that the anchor user plane function network element anchor UPF 1 of the second session is not preferred: location information of the terminal device, a request for an AF, a load status of the SMF, and that the terminal device moves out of the service area of the anchor UPF.

Step 902. The second session management network element sends a non-access-stratum (NAS) message to the terminal device by using the first session management network element and an AMF network element.

In this step, the NAS message may include an ID of the second session, and the NAS message is used by the second session management network element to notify the terminal device that the first session needs to be established. The first session and the second session are sessions connected to a same data network (DN). It should be noted that the first session management network element and the access and mobility management function network element may transparently transmit the NAS message.

Step 903. The terminal device sends a NAS message to the AMF network element.

In this step, the NAS message may include an ID of the first session, a DNN, a request type, and N1 session management information (SM information). The NAS message is used to request to establish the first session. The N1 session management information includes a PDU session establishment request.

Step 904. The AMF network element sends a session management request (SM Request) message to the second session management network element by using the first session management network element.

In this step, in addition to the information included in the NAS message in step 903, the session management request message further includes other related information, such as an AMF ID, location information (User location information) of the terminal device, and an access technology type. It should be noted that the first session management network element may transparently transmit the session management request message.

In a session handover process of the second session, the second session management network element needs to insert a user plane network element that is not within the service area of the second session management network element, that is directly connected to an access network corresponding to the second session. Therefore, the second session management network element stores information about the first session management network element, for example, an ID of the first session management network element. Therefore, the second session management network element may send the session management request message to the first session management network element based on the ID of the first session management network element.

Step 905. The second session management network element sends a session request message to the first session management network element.

In this step, specifically, the second session management network element may send the session request message to the first session management network element based on the ID of the first session management network element. The session request message is used to request to establish the first session.

Step 906. The first session management network element selects an anchor user plane function network element (anchor UPF 2) for the first session based on the session request message.

Step 907. The first session management network element sends an N4 session establishment request message to the anchor UPF 2 network element, and receives an N4 session establishment response message returned by the anchor UPF 2.

It should be noted that tunnel information of the anchor UPF 2 network element may be allocated by the first session management network element or the anchor UPF 2 network element. When the tunnel information is allocated by the first session management network element, the first session management network element may add the tunnel information of the anchor UPF 2 network element to the N4 session establishment request message. When the tunnel information is allocated by the anchor UPF 2 network element, the anchor UPF 2 network element may add the tunnel information of the anchor UPF 2 network element to the N4 session establishment response message. In this step, the N4 session establishment request message may further include information, such as packet detection, UPF execution, and reporting rules, that is provided for the anchor UPF 2 network element.

Step 908. The first session management network element allocates the IP information of the terminal device to the first session based on the session request message, in other words, based on the anchor UPF 2.

It should be noted that a sequence of step 908 and steps 906 and 907 is not limited. When step 908 is performed after step 906, in step 908, the IP information of the terminal device may be specifically allocated to the first session based on the anchor UPF 2 network element selected in step 906.

Step 909. The first session management network element sends a session response message to the second session management network element.

In this step, the session response message includes the IP information. The session response message may further include the tunnel information of the anchor UPF 2 network element.

Step 910. The second session management network element obtains policy information corresponding to the IP information from a policy control function network element based on the IP information.

Step 911. The second session management network element sends a session management response (SM Response) message to the AMF network element by using the first session management network element.

In this step, the session management response message includes N2-interface session management information (N2 SM information) and the N1-interface session management information (N1 SM information). Specifically, the session response message in step 909 includes the tunnel information of the anchor UPF 2 network element, the N2-interface session management information in the session management response message from the second session management network element to the first session management network element includes the tunnel information of the anchor UPF 2 network element, the N1-interface session management information in the session management response message from the second session management network element to the first session management network element includes the IP information, and the first session management network element transparently transmits, to the access and mobility management function network element, the session management response message that is from the second session management network element.

Alternatively, the session response message in step 909 does not include the tunnel information of the anchor UPF 2 network element. The first session management network element needs to add the tunnel information of the anchor UPF 2 network element to the N2-interface session management information in the session management response message that is from the second session management network element, and then sends the session management response message to the access and mobility management function network element.

The N1-interface session management information further includes a PDU session establishment accept message.

Step 912. The AMF network element sends an N2 PDU session request message to the access network ((R)AN) element.

In this step, the N2 PDU session request message includes a NAS message and the N2-interface session management information obtained in step 911. The NAS message includes the PDU session establishment accept message obtained in step 911 and the ID of the first session.

Step 913. The (R)AN element allocates tunnel information of the (R)AN element to the first session.

Step 914. The (R)AN element interacts with the terminal device to establish a radio resource, and sends, to the terminal device, the NAS message included in the N2 PDU session request message received in step 912.

Step 915. The ((R)AN) element sends an N2 PDU session acknowledgment (N2 PDU Session Ack) message to the AMF network element.

In this step, the N2-interface PDU session acknowledgment message includes the tunnel information of the (R)AN element that is allocated by the (R)AN element to the first session in step 913.

Step 916. The AMF network element sends a session management request message to the first session management network element.

In this step, the session management request message carries the tunnel information of the (R)AN element.

Step 917. The first session management network element sends an N4 session modification request message to the anchor UPF 2 network element, and receives an N4 session modification response message returned by the anchor UPF 2.

In this step, the N4-interface session modification request message carries the tunnel information of the (R)AN element, to notify the anchor UPF 2 network element of the tunnel information of the access network element.

Step 918. The first session management network element returns a session management response message to the access and mobility management function network element.

In this step, the session management response message is used as a reply to the session management request message in step 916 from the access and mobility management function network element.

It should be noted that a sequence of step 917 and step 918 is not limited.

As shown in FIG. 10, when moving to a location 2, the terminal device completes establishment of the first session by using a control plane path B3, and A3 in FIG. 10 represents a data path of the established first session.

Similar to the embodiment shown in FIG. 5A-1 and FIG. 5A-2, in the foregoing descriptions of this embodiment, an example in which the first session management network element sends the IP information to the second session management network element and the IP information is used by the second session management network element to obtain the policy information corresponding to the IP information is used. Specifically, in step 909, the first session management network element sends the session response message including the IP information to the second session management network element. In step 910, the second session management network element obtains the policy information corresponding to the IP information from the PCF network element based on the IP information.

Alternatively, the first session management network element may send the IP information to the PCF network element, and the IP information is used by the first session management network element to obtain the policy information corresponding to the IP information. Specifically, step 910 in FIG. 9A and FIG. 9B is replaced with step 910'. Correspondingly, the session response message in step 909 may not include the IP information.

Step 910'. The first session management network element obtains the policy information corresponding to the IP information from the PCF network element based on the IP information.

In this step, it should be noted that step 910' may be performed after step 908, and a sequence of step 910' and step 908 is not limited. Further optionally, the first session management network element may obtain an identity of the PCF before step 910' in the procedure for newly establishing the session that is shown in FIG. 9A and FIG. 9B. For example, in step 905, the session request message from the second session management network element to the first session management network element may include the identity of the PCF network element. Alternatively, the first session management network element may obtain the identity of the PCF network element in an insertion procedure of the first session management network element that is shown in FIG. 5B.

According to the session management method provided in this application, the second session management network element sends the session request message to the first session management network element; and the first session management network element selects the anchor user plane function network element for the first session and allocates the IP information of the terminal device based on the session request message, to establish the session in a scenario of two session management network elements. In addition, it can be learned from FIG. 10 that the newly established first session is still managed by the second session management network element. Therefore, session information and a peripheral interface of the second session management network element may be reused, for example, a PCC policy and an IP address of the PCF are reused, eliminating a DN authorization process.

Figure 11A:
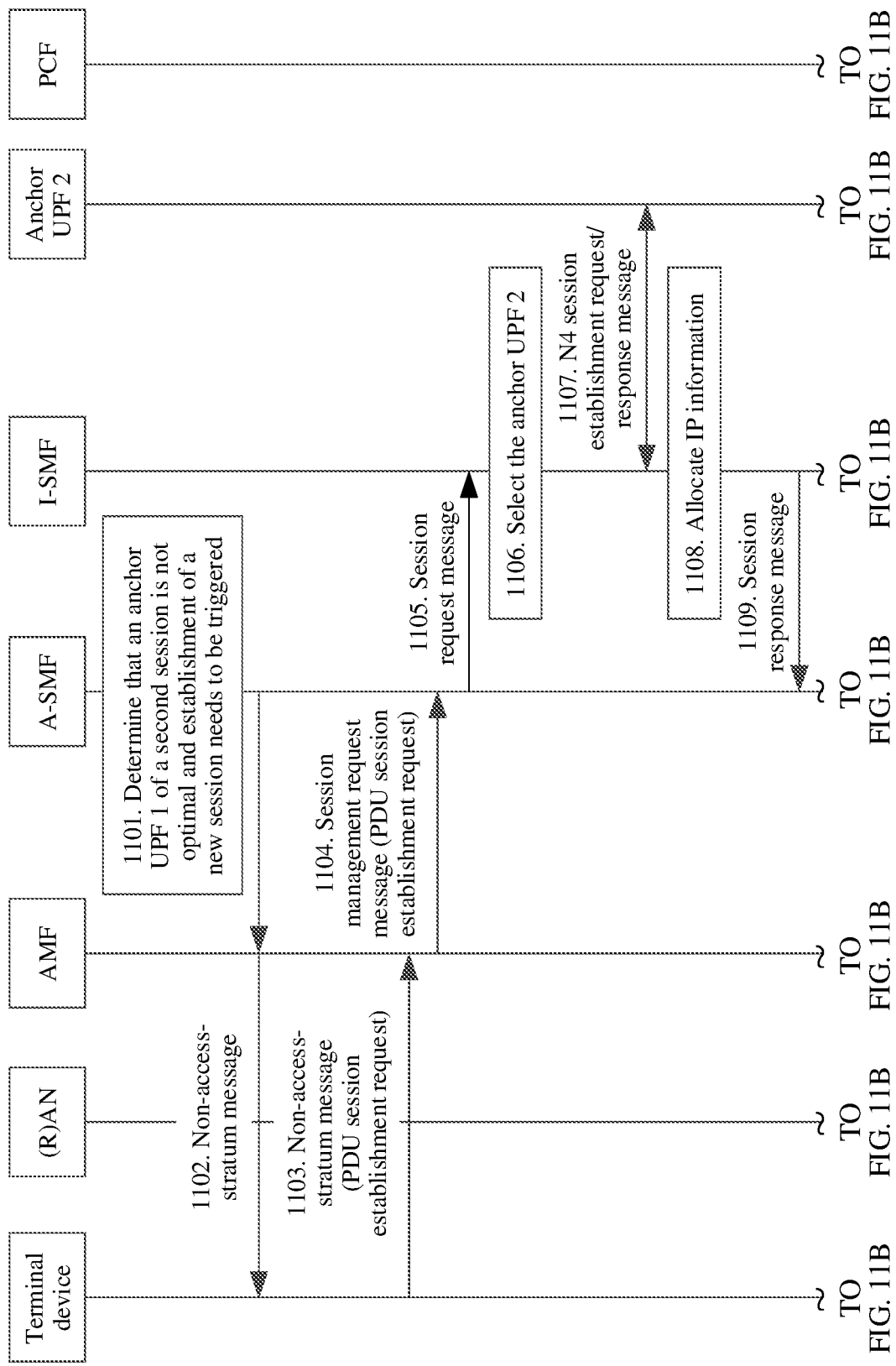
FIG. 11A and FIG. 11B are a flowchart of a session management method according to still another embodiment of this application.
Figure 11B:
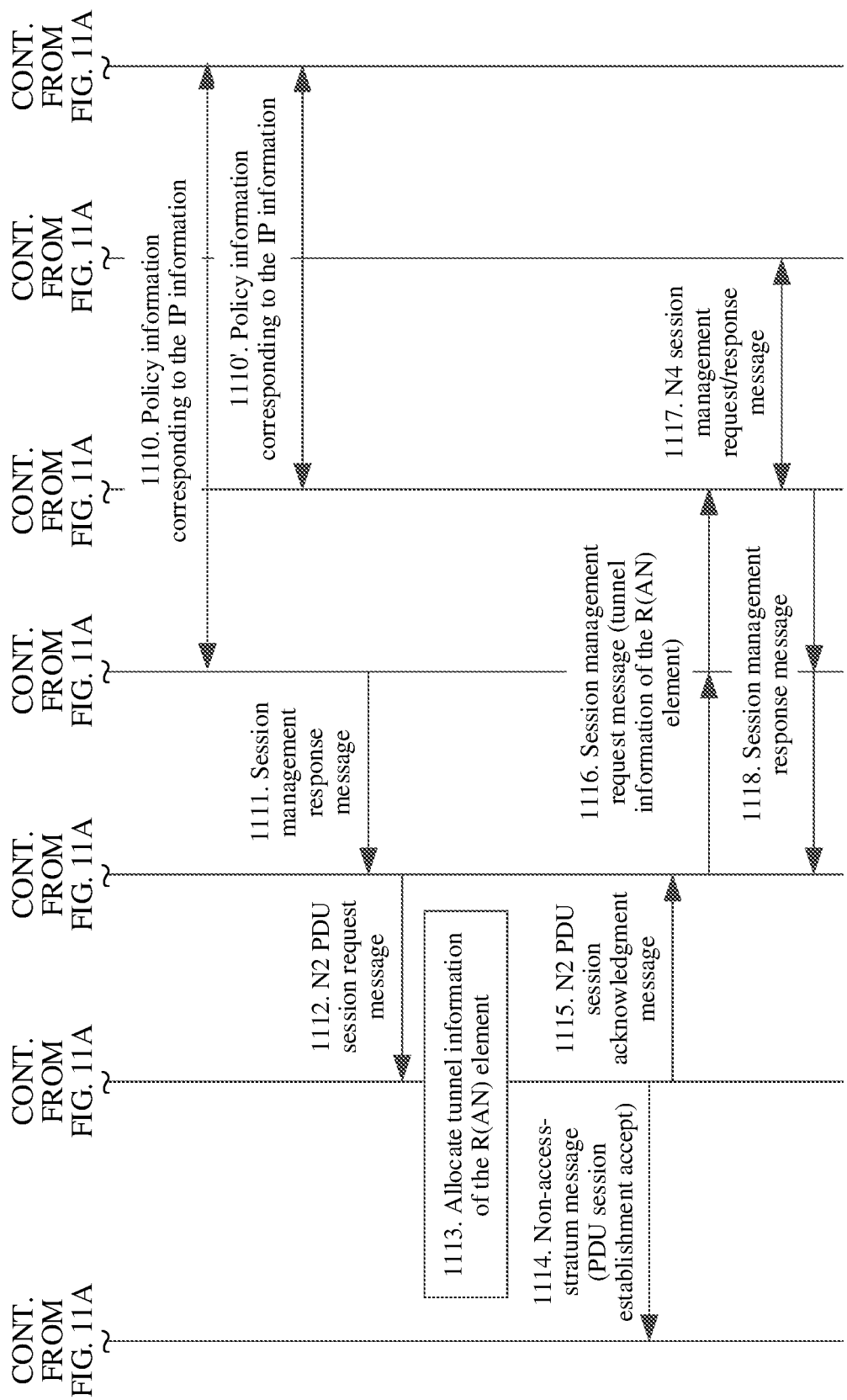
Figure 12:
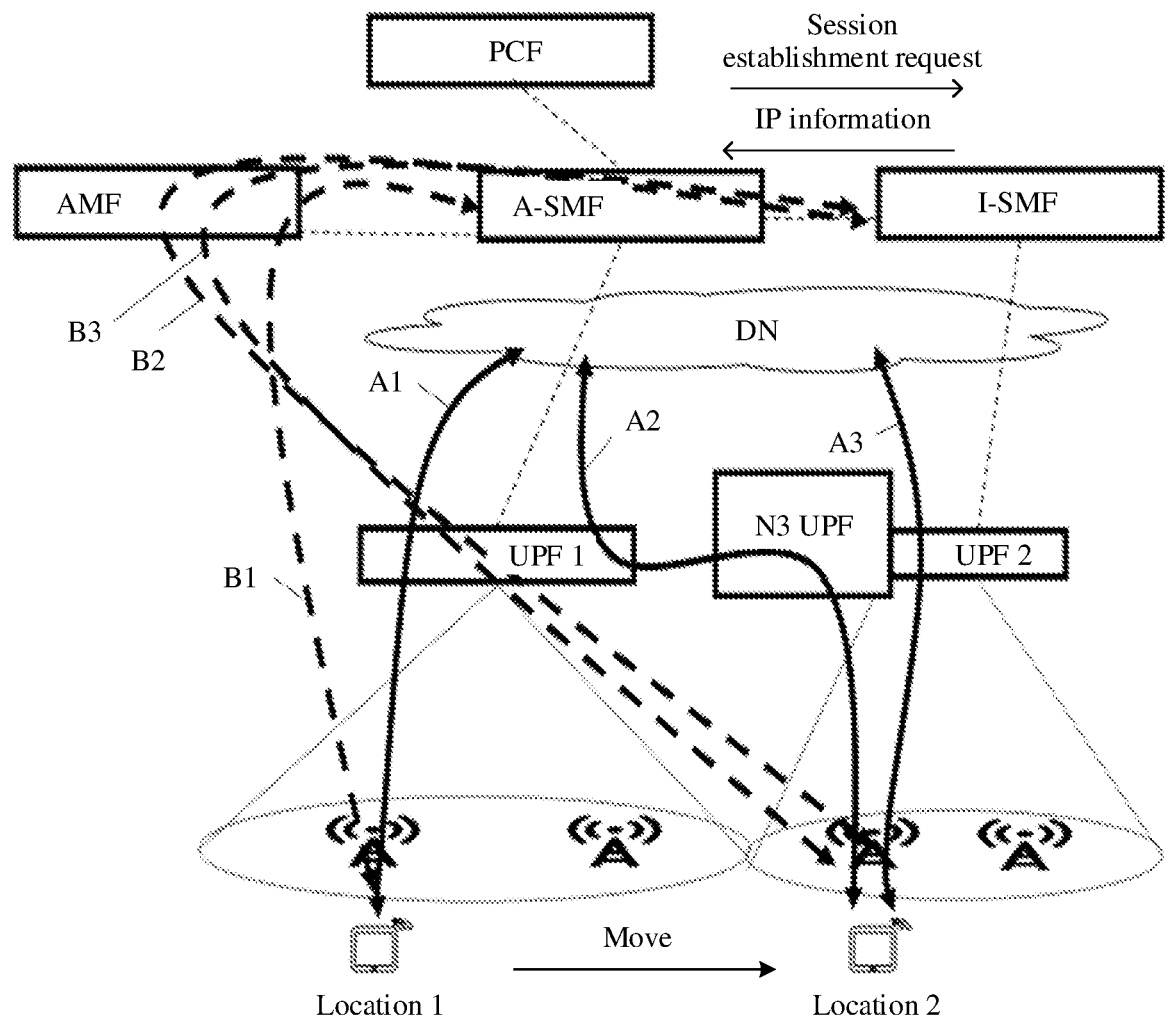
FIG. 12 is a schematic diagram of the session management method according to the still another embodiment of this application.

FIG. 11A and FIG. 11B are a flowchart of a session management method according to still another embodiment of this application; and FIG. 12 is a schematic diagram of the session management method according to the still another embodiment of this application. This embodiment uses the architecture shown in FIG. 2 as an example: A first session management network element is an I-SMF network element, a second session management network element is an A-SMF network element, the first session management network element selects an anchor user plane function network element for a first session and allocates IP information of a terminal device to the first session, and the first session and a second session are different sessions. In this embodiment, for same content, refer to the descriptions in the embodiment in FIG. 9A and FIG. 9B, and FIG. 10. As shown in FIG. 11A and FIG. 11B, and FIG. 12, the method in this embodiment may include the following steps.

Step 1101. The second session management network element determines that an anchor user plane function network element anchor UPF 1 of the second session is not preferred and establishment of a new session needs to be triggered.

It should be noted that step 1101 is similar to step 901, and details are not described herein again.

Step 1102. The second session management network element sends a non-access-stratum (NAS) message to the terminal device by using an AMF network element.

In this step, the NAS message may include an ID of the second session, and the NAS message is used by the second session management network element to notify the terminal device that the first session needs to be established. The first session and the second session are sessions connected to a same data network (DN). It should be noted that the access and mobility management function network element transparently transmits the NAS message.

Step 1103. The terminal device sends a NAS message to the AMF network element.

In this step, the NAS message may include an ID of the first session, a DNN, a request type, and N1 session management information (SM information). The NAS message is used to request to establish the first session. The N1 session management information includes a PDU session establishment request.

Step 1104. The AMF network element sends a session management request (SM Request) message to the second session management network element.

In this step, in addition to the information included in the NAS message in step 1103, the session management request message further includes other related information, such as an AMF ID, location information (User location information) of the terminal device, and an access technology type.

Step 1105. The second session management network element sends a session request message to the first session management network element.

Step 1106. The first session management network element selects an anchor user plane function network element (anchor UPF 2) for the first session based on the session request message.

Step 1107. The first session management network element sends an N4 session establishment request message to the anchor UPF 2 network element, and receives an N4 session establishment response message returned by the anchor UPF 2.

Step 1108. The first session management network element allocates the IP information of the terminal device to the first session based on the session request message, in other words, based on the anchor UPF 2.

It should be noted that step 1105 to step 1108 are similar to step 905 to step 908, and details are not described herein again.

Step 1109. The first session management network element sends a session response message to the second session management network element.

In this step, the session response message includes the IP information and tunnel information of the anchor UPF 2 network element.

Step 1110. The second session management network element obtains policy information corresponding to the IP information from a policy control function network element based on the IP information.

Step 1111. The second session management network element sends a session management response (SM Response) message to the AMF network element.

In this step, the session management response message includes N2-interface session management information (N2 SM information) and the N1-interface session management information (N1 SM information). The N2-interface session management information includes the tunnel information of the anchor UPF 2 network element, and the N1-interface session management information includes the IP information.

The N1-interface session management information further includes a PDU session establishment accept message.

Step 1112. The AMF network element sends an N2 PDU session request message to a (R)AN element.

Step 1113. The (R)AN element allocates tunnel information of the (R)AN element to the first session.

Step 1114. The (R)AN element interacts with the terminal device, and sends, to the terminal device, a NAS message included in the N2 PDU session request message received in step 1112.

Step ills. The ((R)AN) element sends an N2 PDU session acknowledgment (N2 PDU Session Ack) message to the AMF network element.

It should be noted that step 1112 to step 1115 are similar to step 912 to step 915, and details are not described herein again.

Step 1116. The AMF network element sends a session management request message to the first session management network element by using the second session management network element.

In this step, the session management request message carries the tunnel information of the (R)AN element. It should be noted that the second session management network element may transparently transmit the session management request message.

Step 1117. The first session management network element sends an N4 session modification request message to the anchor UPF 2 network element, and receives an N4 session modification response message returned by the anchor UPF 2.

In this step, the N4 session modification request message carries the tunnel information of the (R)AN element, to notify the anchor UPF 2 network element of the tunnel information of the (R)AN element.

Step 1118. The first session management network element returns a session management response message to the AMF network element by using the second session management network element.

In this step, the session management response message is used as a reply to the session management request message in step 1116 from the access and mobility management function network element. It should be noted that the second session management network element may transparently transmit the session management response message.

Similar to the embodiment shown in FIG. 7A-1 and FIG. 7A-2, in the foregoing descriptions of this embodiment, an example in which the first session management network element sends the IP information to the second session management network element and the IP information is used by the second session management network element to obtain the policy information corresponding to the IP information is used. Specifically, in step 1109, the first session management network element sends the session response message including the IP information to the second session management network element. In step 1110, the second session management network element obtains the policy information corresponding to the IP information from the PCF network element based on the IP information.

Alternatively, the first session management network element may send the IP information to the PCF network element, and the IP information is used by the first session management network element to obtain the policy information corresponding to the IP information. Specifically, step 1110 in FIG. 11A and FIG. 11B is replaced with step 1110'. Correspondingly, the session response message in step 1109 may not include the IP information.

Step 1110'. The first session management network element obtains the policy information corresponding to the IP information from the PCF network element based on the IP information.

In this step, it should be noted that step 1110' may be performed after step 1108, and a sequence of step 1110' and step 1108 is not limited. Further optionally, the first session management network element may obtain an identity of the PCF before step 1110' in the procedure for newly establishing the session that is shown in FIG. 11A and FIG. 11B. For example, in step 1105, the session request message from the second session management network element to the first session management network element may include the identity of the PCF network element. Alternatively, the first session management network element may obtain the identity of the PCF network element in an insertion procedure of the first session management network element that is shown in FIG. 7B.

According to the session management method provided in this application, the second session management network element sends the session request message to the first session management network element; and the first session management network element selects the anchor user plane function network element for the first session and allocates the IP information of the terminal device based on the session request message, to establish the session in a scenario of two session management network elements. In addition, it can be learned from FIG. 12 that the newly established first session is still managed by the second session management network element. Therefore, session information and a peripheral interface of the second session management network element may be reused, for example, a PCC policy and an IP address of the PCF are reused, eliminating a DN authorization process.

It should be noted that a difference between the embodiment shown in FIG. 11A and FIG. 11B, and FIG. 12 and the embodiment shown in FIG. 9A and FIG. 9B, and FIG. 10 mainly lies in different application architectures. Specifically, in the embodiment shown in FIG. 9A and FIG. 9B, and FIG. 10, there is an interface between the first session management network element and the access and mobility management function network element, there is an interface between the second session management network element and the access and mobility management function network element before the session handover, and there is an interface between the first session management network element and the access and mobility management function network element after the session handover. In the embodiment shown in FIG. 11A and FIG. 11B, and FIG. 12, there is an interface between the second session management network element and the access and mobility management function network element. Therefore, in the embodiment shown in FIG. 9A and FIG. 9B, and FIG. 10, the message between the second session management network element and the AMF network element needs to pass through the first session management network element. However, in the embodiment shown in FIG. 11A and FIG. 11B, and FIG. 12, the message between the first session management network element and the AMF network element needs to pass through the second session management network element.

It should be noted that the control plane paths in FIG. 6, FIG. 8, FIG. 10, and FIG. 12 do not pass through a user plane network element.

It should be noted that in the embodiments shown in FIG. 5 to FIG. 12, the first session management network element is fixed, and the second session management network element changes as the terminal device moves.

Optionally, based on the embodiments shown in FIG. 5 to FIG. 12, the methods may further include: releasing, by the first session management network element, a user plane resource of the first session and the IP information when determining that the first session needs to be released. Optionally, the first session management network element may determine, according to release indication information from the second session management network element, to release the first session, where the release indication information is used to instruct to release the first session. Alternatively, the first session management network element may determine, based on the location information of the terminal device and the like, to release the first session.

Figure 13:
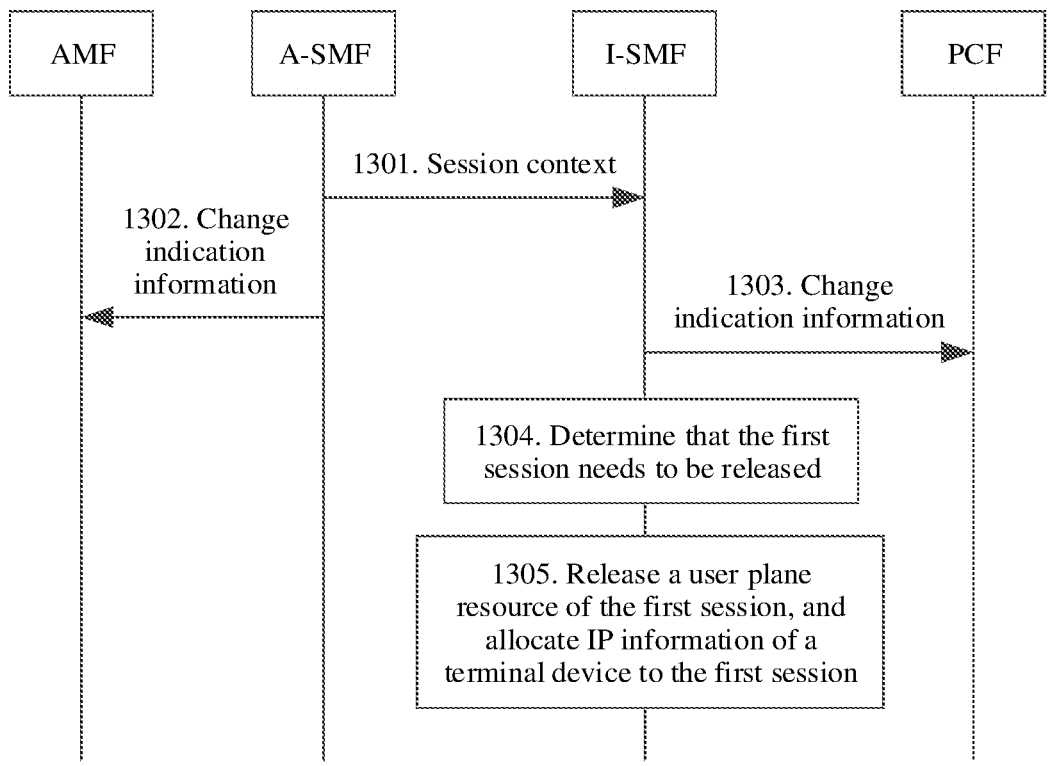
FIG. 13 is a flowchart of a session management method according to still another embodiment of this application.

FIG. 13 is a flowchart of a session management method according to still another embodiment of this application. Based on the embodiments shown in FIG. 5 to FIG. 12, this embodiment mainly describes a specific implementation in which the second session management network element is replaced with the first session management network element to manage the first session. As shown in FIG. 13, the method in this embodiment may include the following steps.

Step 1301. The second session management network element sends a session context of the first session to the first session management network element.

In this step, the session context of the first session may include related information, for example, the policy information, the interface information of the PCF, and the IP information of the terminal device that is allocated to the first session, that is obtained by the second session management network element through interaction with the PCF network element.

Step 1302. The second session management network element sends change indication information to the AMF network element.

In this step, the change indication information is used to indicate that the first session management network element manages the first session. Specifically, the second session management network element may send the change indication information to the AMF network element after the session context of the first session is migrated. Optionally, after receiving the change indication information, the AMF network element may return a response to the second session management network element.

Step 1303. The first session management network element sends the change indication information to the PCF network element.

It should be noted that a sequence of step 1302 and step 1303 is not limited. Similarly, after receiving the change indication information, the PCF network element may return a response to the first session management network element.

Step 1304. The first session management network element determines that the first session needs to be released.

In this step, specifically, when a release condition of the first session is triggered, the first session management network element determines that the first session needs to be released. The terminal device, the PCF network element, or the first session management network element may trigger the release condition of the first session.

Step 1305. The first session management network element releases the user plane resource of the first session and the IP information of the terminal device that is allocated to the first session.

It should be noted that, related content that a session management network element managing the first session changes from the second session management network element to the first session management network element is mainly described in this embodiment. For a specific management manner after the first session management network element manages the first session, for example, releasing the user plane resource of the first session and the IP information allocated to the first session, refer to existing implementations. Details are not described herein.

It should be noted that after the first session management network element manages the first session, similar to the second session management network element, the first session management network element may also send the session request message to another session management network element, and the another session management network element completes the foregoing functions of the first session management network element.

According to the session management method provided in this application, the second session management network element sends the session context of the first session to the first session management network element, the second session management network element sends, to the AMF network element, the change indication information used to indicate that the first session management network element manages the first session, and the first session management network element sends the change indication information to the PCF network element, so that the session management network element managing the first session changes from the second session management network element to the first session management network element, and a change of the session management network element managing the first session is implemented in a scenario of two session management network elements.

Figure 14:
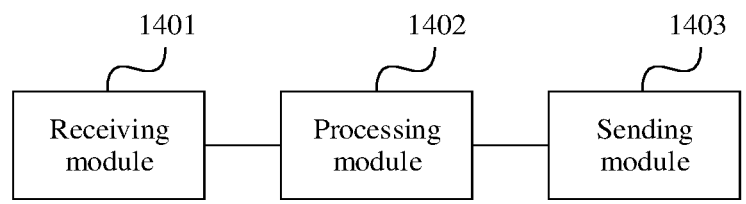
FIG. 14 is a schematic structural diagram of a session management apparatus according to an embodiment of this application.

FIG. 14 is a schematic structural diagram of a session management apparatus according to an embodiment of this application. The apparatus provided in this embodiment may be implemented as a part or all of a first session management network element by using software, hardware, or a combination thereof. As shown in FIG. 14, the apparatus may include: a receiving module 1401, configured to receive a session request message from a second session management network element; a processing module 1402, configured to allocate Internet protocol IP information of a terminal device to a first session based on the session request message, where the first session is a branch of an established second session, or the first session and the established second session are different sessions; and a sending module 1403, configured to send the IP information of the terminal device to a policy control function network element or the second session management network element, where the IP information is used to obtain policy information corresponding to the IP information.

Optionally, the receiving module 1401 is further configured to obtain an identity of the policy control function network element.

The sending module 1403 is specifically configured to send the IP information of the terminal device to the policy control function network element based on the identity of the policy control function network element.

Optionally, that the receiving module 1401 obtains the identity of the policy control function network element specifically includes: receiving the identity of the policy control function network element from the second session management network element; or receiving the identity of the policy control function network element from an access and mobility management function network element.

Optionally, the processing module 1402 is further configured to select an anchor user plane function network element corresponding to the first session, and determine tunnel information of the anchor user plane function network element.

Optionally, the processing module 1402 is further configured to select a branching point user plane function network element corresponding to the first session, and determine tunnel information of the branching point user plane function network element.

Optionally, the sending module 1403 is further configured to send the tunnel information of the anchor user plane function network element to the access and mobility management function network element.

Optionally, the sending module 1403 is further configured to send the tunnel information of the branching point user plane function network element to the access and mobility management function network element.

Optionally, the receiving module 1401 is further configured to receive a session context of the first session from the second session management network element; and the sending module 1403 is further configured to send change indication information to the policy control function network element, where the change indication information is used to indicate that the first session management network element manages the first session.

Optionally, the receiving module 1401 is further configured to receive release indication information from the second session management network element, where the release indication information is used to instruct to release the first session; and the processing module 1402 is further configured to release a user plane resource of the first session and the IP information according to the release indication information.

Optionally, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

Optionally, the sending module 1403 is further configured to send the IP information to the terminal device by using a user plane.

Optionally, the receiving module 1401 is further configured to receive sending indication information from the second session management network element, where the sending indication information is used to instruct the first session management network element to send the IP information to the terminal device.

Optionally, the session request message includes at least one of the following: an identity of the terminal device, an identity of the first session, a data network name, and a session and service continuity mode.

The session management apparatus provided in this embodiment may be configured to execute the technical solution on the first session management network element side in any of the method embodiments shown in FIG. 4 to FIG. 13. An implementation principle and technical effects of the session management apparatus are similar to those in the method embodiments. Details are not described herein again.

This application may further provide a session management apparatus. The apparatus may be implemented as a part or all of a second session management network element by using software, hardware, or a combination thereof. The apparatus provided in this embodiment has a structure similar to that of the apparatus shown in FIG. 14, and may also include a processing module and a sending module. The processing module is configured to determine to newly establish a first session, where the first session is a branch of an established second session, or the first session and the established second session are different sessions. The sending module is configured to send a session request message to a first session management network element, where the session request message is used to request the first session management network element to allocate Internet protocol IP information of a terminal device to the first session.

Optionally, the apparatus in this embodiment may further include a receiving module, configured to receive the IP information of the terminal device from the first session management network element; and the processing module is further configured to obtain policy information corresponding to the IP information from a policy control function network element based on the IP information.

Optionally, the sending module is further configured to send an identity of a policy control function network element to the first session management network element.

Optionally, the receiving module is further configured to receive tunnel information of a user plane function network element of the first session from the first session management network element, where the user plane function network element is an anchor user plane function network element or a branching point user plane function network element that corresponds to the first session.

The sending module is further configured to send the tunnel information of the user plane function network element of the first session to an access and mobility management function network element.

Optionally, the sending module is further configured to send a session context of the first session to the first session management network element; and the sending module is further configured to send change indication information to the access and mobility management function network element, where the change indication information is used to indicate that the first session management network element manages the first session.

Optionally, the sending module is further configured to send release indication information to the first session management network element when it is determined that the first session needs to be released, where the release indication information is used to instruct to release the first session.

Optionally, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

Optionally, the sending module is further configured to send sending indication information to the first session management network element, where the sending indication information is used to instruct the first session management network element to send the IP information to the terminal device.

Optionally, the session request message includes at least one of the following: an identity of the terminal device, an identity of the first session, a data network name, and a session and service continuity mode.

The session management apparatus provided in this embodiment may be configured to execute the technical solution on the second session management network element side in any of the method embodiments shown in FIG. 4 to FIG. 13. An implementation principle and technical effects of the session management network element are similar to those in the method embodiments. Details are not described herein again.

Figure 15:
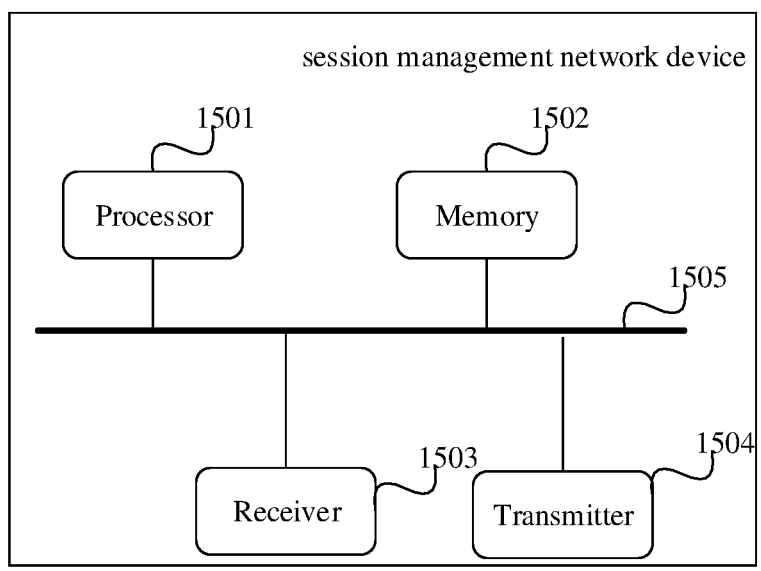
FIG. 15 is a schematic structural diagram of a session management network element according to an embodiment of this application.

FIG. 15 is a schematic structural diagram of a session management network element according to an embodiment of this application. As shown in FIG. 15, the session management network element may include a processor 1501, a memory 1502, a receiver 1503, a transmitter 1504, and at least one communications bus 1505. The communications bus 1505 is configured to implement communication connection between components. The memory 1502 may include a high-speed RAM, and may further include a non-volatile memory (NVM), such as at least one magnetic disk storage. The memory 1502 may store various programs to complete various processing functions and implement the method steps in the embodiments. The receiver 1503 in this embodiment may be a corresponding input interface that has a communication function and an information receiving function, or may be a radio frequency module or a baseband module on a first session management network element. The transmitter 1504 in this embodiment may be a corresponding output interface that has a communication function and an information sending function, or may be a radio frequency module or a baseband module on the first session management network element.

In this embodiment, the receiver 1503 is configured to receive a session request message from a second session management network element.

The processor 1501 is configured to allocate Internet protocol IP information of a terminal device to a first session based on the session request message, where the first session is a branch of an established second session, or the first session and the established second session are different sessions.

The transmitter 1504 is configured to send the IP information of the terminal device to a policy control function network element or the second session management network element, where the IP information is used to obtain policy information corresponding to the IP information.

Optionally, the receiver 1503 is further configured to obtain an identity of the policy control function network element.

The transmitter 1504 is specifically configured to send the IP information of the terminal device to the policy control function network element based on the identity of the policy control function network element.

Optionally, that the receiver 1503 obtains the identity of the policy control function network element specifically includes: receiving the identity of the policy control function network element from the second session management network element; or receiving the identity of the policy control function network element from an access and mobility management function network element.

Optionally, the processor 1501 is further configured to select an anchor user plane function network element corresponding to the first session, and determine tunnel information of the anchor user plane function network element.

Optionally, the processor 1501 is further configured to select a branching point user plane function network element corresponding to the first session, and determine tunnel information of the branching point user plane function network element.

Optionally, the transmitter 1504 is further configured to send the tunnel information of the anchor user plane function network element to the access and mobility management function network element.

Optionally, the transmitter 1504 is further configured to send the tunnel information of the branching point user plane function network element to the access and mobility management function network element.

Optionally, the receiver 1503 is further configured to receive a session context of the first session from the second session management network element; and the transmitter 1504 is further configured to send change indication information to the policy control function network element, where the change indication information is used to indicate that the first session management network element manages the first session.

Optionally, the receiver 1503 is further configured to receive release indication information from the second session management network element, where the release indication information is used to instruct to release the first session; and the processor 1501 is further configured to release a user plane resource of the first session and the IP information according to the release indication information.

Optionally, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

Optionally, the transmitter 1504 is further configured to send the IP information to the terminal device by using a user plane.

Optionally, the receiver 1503 is further configured to receive sending indication information from the second session management network element, where the sending indication information is used to instruct the first session management network element to send the IP information to the terminal device.

Optionally, the session request message includes at least one of the following: an identity of the terminal device, an identity of the first session, a data network name, and a session and service continuity mode.

The session management network element provided in this embodiment may be configured to execute the technical solution on the first session management network element side in any of the method embodiments shown in FIG. 4 to FIG. 13. An implementation principle and technical effects of the session management apparatus are similar to those in the method embodiments. Details are not described herein again.

This application may further provide a session management network element. The session management network element has a structure similar to that of the session management network element shown in FIG. 15. A processor is configured to determine to newly establish a first session, where the first session is a branch of an established second session, or the first session and the established second session are different sessions; and a transmitter is configured to send a session request message to a first session management network element, where the session request message is used to request the first session management network element to allocate Internet protocol (IP) information of a terminal device to the first session.

Optionally, a receiver is configured to receive the IP information of the terminal device from the first session management network element; and the processor is further configured to obtain policy information corresponding to the IP information from a policy control function network element based on the IP information.

Optionally, the transmitter is further configured to send an identity of a policy control function network element to the first session management network element.

Optionally, the receiver is further configured to receive tunnel information of a user plane function network element of the first session from the first session management network element, where the user plane function network element is an anchor user plane function network element or a branching point user plane function network element that corresponds to the first session.

The transmitter is further configured to send the tunnel information of the user plane function network element of the first session to an access and mobility management function network element.

Optionally, the transmitter is further configured to send a session context of the first session to the first session management network element; and the transmitter is further configured to send change indication information to the access and mobility management function network element, where the change indication information is used to indicate that the first session management network element manages the first session.

Optionally, the transmitter is further configured to send release indication information to the first session management network element when it is determined that the first session needs to be released, where the release indication information is used to instruct to release the first session.

Optionally, the first session management network element is a session management network element that manages the anchor user plane function network element corresponding to the first session and a user plane function network element that is directly connected to an access network element and that corresponds to the second session of the terminal device, the second session management network element is a session management network element that manages an anchor user plane function network element corresponding to the second session, and the first session and the second session are a same session or different sessions.

Optionally, the transmitter is further configured to send sending indication information to the first session management network element, where the sending indication information is used to instruct the first session management network element to send the IP information to the terminal device.

Optionally, the session request message includes at least one of the following: an identity of the terminal device, an identity of the first session, a data network name, and a session and service continuity mode.

The session management network element provided in this embodiment may be configured to execute the technical solution on the second session management network element side in any of the method embodiments shown in FIG. 4 to FIG. 13. An implementation principle and technical effects of the session management network element are similar to those in the method embodiments. Details are not described herein again.

An embodiment of this application further provides a session management system, including the session management apparatuses provided in the foregoing embodiments.

This application further provides a readable storage medium, where the readable storage medium stores an instruction. When at least one processor of a first session management network element executes the instruction, the first session management network element performs the session management method on the first session management network element side in any of the method embodiments shown in FIG. 4 to FIG. 13.

This application further provides a readable storage medium, where the readable storage medium stores an instruction. When at least one processor of a second session management network element executes the instruction, the second session management network element performs the session management method on the second session management network element side in any of the method embodiments shown in FIG. 4 to FIG. 13.

This application further provides a program product. The program product includes an instruction, and the instruction is stored in a readable storage medium. At least one processor of a first session management network element may read the instruction from the readable storage medium and execute the instruction, so that the first session management network element performs the session management method on the first session management network element side in any of the method embodiments shown in FIG. 4 to FIG. 13.

This application further provides a program product. The program product includes an instruction, and the instruction is stored in a readable storage medium. At least one processor of a second session management network element may read the instruction from the readable storage medium and execute the instruction, so that the second session management network element performs the session management method on the second session management network element side in any of the method embodiments shown in FIG. 4 to FIG. 13.

In a specific implementation of the first session management network element or the second session management network element, it should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the methods disclosed with reference to this application may be directly performed by a hardware processor, or may be performed by a combination of hardware and a software module in the processor.

All or some of the steps of the foregoing method embodiments may be implemented by a program instructing relevant hardware. The foregoing program may be stored in a readable memory. When the program is executed, the steps in the method embodiments are performed. The memory (storage medium) includes a read-only memory (ROM), a RAM, a flash memory, a hard disk, a solid state disk, a magnetic tape, a floppy disk, an optical disc, and any combination thereof.

What is claimed is:

1. An apparatus, comprising:
at least one processor; and
a non-transitory memory coupled to the at least one processor, wherein the at least one processor is configured to execute instructions stored in the memory to cause the apparatus to:
receive a request message from a second session management function network element, wherein the request message requests to establish a new branch of a session, and the session comprises an established branch corresponding to a first anchor user plane function network element managed by the second session management function network element;
select a second anchor user plane function network element corresponding to the new branch of the session;
select a branching point user plane function network element, wherein the branching point user plane function network element is connected with an access network element, the first anchor user plane function network element, and the second anchor user plane function network element;
allocate internet protocol (IP) information of a terminal device to the new branch of the session based on the second anchor user plane function network element; and
send the IP information of the terminal device to the second session management function network element.

2. The apparatus according to claim 1, wherein the at least one processor is further configured to execute instructions stored in the memory to cause the apparatus to:
receive tunnel information of the second anchor user plane function network element from the second anchor user plane function network element.

3. The apparatus according to claim 2, wherein the at least one processor is further configured to execute instructions stored in the memory to cause the apparatus to:
send the tunnel information of the second anchor user plane function network element to the branching point user plane function network element.

4. The apparatus according to claim 1, wherein the at least one processor is further configured to execute instructions stored in the memory to cause the apparatus to:
receive tunnel information of the branching point user plane function network from the branching point user plane function network element.

5. The apparatus according to claim 4, wherein the at least one processor is further configured to execute instructions stored in the memory to cause the apparatus to:
send the tunnel information of the branching point user plane function network element to the second anchor user plane function network element.

6. The apparatus according to claim 4 wherein the at least one processor is further configured to execute instructions stored in the memory to cause the apparatus to:
send the tunnel information of the branching point user plane function network element to the second session management function network element.

7. The apparatus according to claim 4, wherein the at least one processor is further configured to execute instructions stored in the memory to cause the apparatus to:
send the tunnel information of the branching point user plane function network element to the access network element through an access and mobility management function network element.

8. The apparatus according to claim 1, wherein the request message comprises identity information of the session.

9. The apparatus according to claim 1, wherein the session is a multi-homed packet data unit (PDU) session.

10. The apparatus according to claim 1, wherein the IP information of the terminal device is an internet protocol version 6 (IPv6) prefix.

11. The apparatus according to claim 1, wherein the apparatus is or is comprised in a first session management function network element.

12. A method, comprising:
receiving, by a first session management function network element, a request message from a second session management function network element, wherein the request message requests to establish a new branch of a session, and the session comprises an established branch corresponding to a first anchor user plane function network element managed by the second session management function network element;
selecting, by the first session management function network element, a second anchor user plane function network element corresponding to the new branch of the session;
selecting, by the first session management function network element, a branching point user plane function network element, wherein the branching point user plane function network element is connected with an access network element, the first anchor user plane function network element, and the second anchor user plane function network element;
allocating, by the first session management function network element, internet protocol (IP) information of a terminal device to the new branch of the session based on the second anchor user plane function network element; and
sending, by the first session management function network element, the IP information of the terminal device to the second session management function network element.

13. A method, comprising:
receiving, by a first session management function network element, a request message from a second session management function network element, wherein the request message requests to establish a new branch of a session, and the session includes an established branch corresponding to a first anchor user plane function network element managed by the second session management function network element;
selecting, by the first session management function network element, a second anchor user plane function network element corresponding to the new branch of the session;
allocating, by the second anchor user plane function network element, tunnel information of the second anchor user plane function network element;
sending, by the second anchor user plane function network element, the tunnel information of the second anchor user plane function network element to the first session management function network element;
allocating, by the first session management function network element, internet protocol (IP) information of a terminal device to the new branch of the session based on the selected second anchor user plane function network element; and
sending, by the first session management function network element, the IP information of the terminal device to the second session management function network element.

14. The method according to claim 13, further comprising:
selecting, by the first session management function network element, a branching point user plane function network element, wherein the branching point user plane function network element is connected with an access network element, the first anchor user plane function network element, and the second anchor user plane function network element.

15. The method according to claim 14, further comprising:
sending, by the first session management function network element, the tunnel information of the second anchor user plane function network element to the branching point user plane function network element.

16. The method according to claim 14, further comprising:
allocating, by the branching point user plane function network element, tunnel information of the branching point user plane function network element; and
sending, by the branching point user plane function network element, the tunnel information of the branching point user plane function network element to the first session management function network element.

17. The method according to claim 16, further comprising:
sending, by the first session management function network element, the tunnel information of the branching point user plane function network element to the second anchor user plane function network element.

18. The method according to claim 16, further comprising:
sending, by the first session management function network element, the tunnel information of the branching point user plane function network element to the second session management function network element.

19. The method according to claim 16, further comprising:
sending, by the first session management function network element, the tunnel information of the branching point user plane function network element to the access network element through an access and mobility management function network element.

20. The method according to claim 16, further comprising:
sending, by the second session management function network element, the tunnel information of the branching point user plane function network element to the first anchor user plane function network element.

21. The method according to claim 13, wherein the request message comprises identity information of the session.

22. The method according to claim 13, wherein the session is a multi-homed packet data unit (PDU) session.

23. The method according to claim 13, wherein the IP information of the terminal device is an internet protocol version 6 (IPv6) prefix.

24. A system, comprising:
a first session management function network element, configured to:
receive a request message from a second session management function network element, wherein the request message requests to establish a new branch of a session, and the session includes an established branch corresponding to a first anchor user plane function network element managed by the second session management function network element;
select a second anchor user plane function network element corresponding to the new branch of the session;
allocate internet protocol (IP) information of a terminal device to the new branch of the session based on the selected second anchor user plane function network element; and send the IP information of the terminal device to the second session management function network element; and the second anchor user plane function network element, configured to allocate tunnel information of the second anchor user plane function network element, and to send the tunnel information of the second anchor user plane function network element to the first session management function network element.

25. A program product comprising executable instructions stored in a non-transitory readable storage medium, wherein the executable instructions, when executed by at least one processor of a first session management function network element, cause the first session management function network element to:

receive a request message from a second session management function network element, wherein the request message requests to establish a new branch of a session, and the session includes an established branch corresponding to a first anchor user plane function network element managed by the second session management network element;

select a second anchor user plane function network element corresponding to the new branch of the session;

select a branching point user plane function network element, wherein the branching point user plane function network element is connected with an access network element, the first anchor user plane function network element, and the second anchor user plane function network element;

allocate internet protocol (IP) information of a terminal device to the new branch of the session based on the selected second anchor user plane function network element; and send the IP information of the terminal device to the second session management function network element.

* * * * *

UNITED STATES PATENT AND TRADEMARK OFFICE
CERTIFICATE OF CORRECTION

PATENT NO. : 11,606,839 B2
APPLICATION NO. : 17/354106
DATED : March 14, 2023
INVENTOR(S) : Yang et al.

It is certified that error appears in the above-identified patent and that said Letters Patent is hereby corrected as shown below:

In the Specification

In the Detailed Description of Illustrative Embodiments, Column 26, Line 44; delete "7A-i" and insert --7A-1--.

In the Detailed Description of Illustrative Embodiments, Column 28, Line 9; delete "7A-i" and insert --7A-1--.

In the Detailed Description of Illustrative Embodiments, Column 34, Line 12; delete "ills" and insert --1115--.

Signed and Sealed this
Eighteenth Day of April, 2023

Katherine Kelly Vidal
*Director of the United States Patent and Trademark Office*